US010786874B2

(12) United States Patent
Guo et al.

(10) Patent No.: US 10,786,874 B2
(45) Date of Patent: Sep. 29, 2020

(54) FEMTOSECOND LASER PULSE SURFACE STRUCTURING METHODS AND MATERIALS RESULTING THEREFROM

(71) Applicant: UNIVERSITY OF ROCHESTER, Rochester, NY (US)

(72) Inventors: Chunlei Guo, Rochester, NY (US); Anatoliy Y. Vorobyev, St. Catharines (CA)

(73) Assignee: UNIVERSITY OF ROCHESTER, Rochester, NY (US)

( * ) Notice: Subject to any disclaimer, the term of this patent is extended or adjusted under 35 U.S.C. 154(b) by 395 days.

(21) Appl. No.: 15/384,398

(22) Filed: Dec. 20, 2016

(65) Prior Publication Data

US 2017/0100797 A1     Apr. 13, 2017

Related U.S. Application Data

(60) Continuation of application No. 14/176,707, filed on Feb. 10, 2014, now abandoned, which is a
(Continued)

(51) Int. Cl.
*B23K 26/352* (2014.01)
*B23K 26/0622* (2014.01)
(Continued)

(52) U.S. Cl.
CPC ........ *B23K 26/355* (2018.08); *B23K 26/0006* (2013.01); *B23K 26/0624* (2015.10);
(Continued)

(58) Field of Classification Search
CPC ......... B82Y 30/00; C21D 1/09; B23K 26/355
(Continued)

(56) References Cited

U.S. PATENT DOCUMENTS

| 4,361,630 A | 11/1982 | Johnson, Sr. |
| 4,972,061 A | 11/1990 | Duley et al. |

(Continued)

FOREIGN PATENT DOCUMENTS

| CN | 101712102 | 5/2010 |
| JP | 2001340498 | 12/2001 |

OTHER PUBLICATIONS

U.S. Appl. No. 12/188,258, "Final Office Action", dated Apr. 8, 2013, 12 pages.
(Continued)

*Primary Examiner* — Weiping Zhu
(74) *Attorney, Agent, or Firm* — Kilpatrick Townsend & Stockton LLP

(57) ABSTRACT

Embodiments of the present invention are generally directed to materials processing methods using femtosecond duration laser pulses, and to the altered materials obtained by such methods. The resulting nanostructured (with or without macro- and micro-structuring) materials have a variety of applications, including, for example, aesthetic applications for jewelry or ornamentation; biomedical applications related to biocompatibility; catalysis applications; and modification of, for example, the optical and hydrophilic properties of materials including selective coloring.

8 Claims, 36 Drawing Sheets

Related U.S. Application Data continuation of application No. 13/253,173, filed on Oct. 5, 2011, now Pat. No. 8,685,185, which is a division of application No. 12/188,258, filed on Aug. 8, 2008, now abandoned, which is a division of application No. 11/862,449, filed on Sep. 27, 2007, now abandoned.

(60) Provisional application No. 60/847,916, filed on Sep. 29, 2006.

(51) Int. Cl.

| | |
|---|---|
| B82Y 30/00 | (2011.01) |
| B82Y 40/00 | (2011.01) |
| C22F 3/00 | (2006.01) |
| C21D 8/02 | (2006.01) |
| B23K 26/00 | (2014.01) |
| B23K 26/361 | (2014.01) |
| B23K 26/362 | (2014.01) |
| B44C 1/22 | (2006.01) |
| B23K 103/08 | (2006.01) |
| C21D 1/09 | (2006.01) |
| B23K 103/00 | (2006.01) |
| B23K 103/12 | (2006.01) |
| B23K 103/04 | (2006.01) |
| B23K 103/14 | (2006.01) |
| B23K 103/10 | (2006.01) |
| B23K 103/16 | (2006.01) |

(52) U.S. Cl.
CPC .......... *B23K 26/352* (2015.10); *B23K 26/361* (2015.10); *B23K 26/362* (2013.01); *B44C 1/228* (2013.01); *B82Y 30/00* (2013.01); *B82Y 40/00* (2013.01); *C21D 8/0294* (2013.01); *C22F 3/00* (2013.01); *B23K 2103/05* (2018.08); *B23K 2103/08* (2018.08); *B23K 2103/10* (2018.08); *B23K 2103/12* (2018.08); *B23K 2103/14* (2018.08); *B23K 2103/16* (2018.08); *B23K 2103/42* (2018.08); *B23K 2103/50* (2018.08); *B23K 2103/52* (2018.08); *B23K 2103/54* (2018.08); *B23K 2103/56* (2018.08); *C21D 1/09* (2013.01); *Y10T 428/12201* (2015.01); *Y10T 428/12993* (2015.01)

(58) Field of Classification Search
USPC ........................................................ 148/565
See application file for complete search history.

(56) References Cited

U.S. PATENT DOCUMENTS

| | | | |
|---|---|---|---|
| 5,635,089 | A | 6/1997 | Singh et al. |
| 6,180,318 | B1 | 1/2001 | Fitzer et al. |
| 6,312,768 | B1 | 11/2001 | Rode et al. |
| 6,660,363 | B1 | 12/2003 | Barthlott |
| 6,979,798 | B2 | 12/2005 | Gu et al. |
| 7,103,076 | B2 | 9/2006 | Kitaoka et al. |
| 8,238,098 | B1 | 8/2012 | Rivas |
| 2003/0029495 | A1 | 2/2003 | Mazur et al. |
| 2006/0000814 | A1 | 1/2006 | Gu et al. |
| 2006/0116000 | A1 | 6/2006 | Yamamoto |
| 2006/0207976 | A1 | 9/2006 | Bovatsek et al. |
| 2006/0219676 | A1* | 10/2006 | Taylor .................. B82Y 20/00 219/121.69 |
| 2007/0038176 | A1* | 2/2007 | Weber .................... A61L 27/50 604/93.01 |
| 2009/0213883 | A1 | 8/2009 | Mazur et al. |
| 2011/0181878 | A1 | 7/2011 | Parng et al. |
| 2012/0328905 | A1 | 12/2012 | Guo et al. |
| 2015/0136226 | A1 | 5/2015 | Guo et al. |

OTHER PUBLICATIONS

U.S. Appl. No. 12/188,258, "Final Office Action", dated Jan. 4, 2012, 13 pages.

U.S. Appl. No. 12/188,258, "Non-Final Office Action", dated Sep. 28, 2011, 11 pages.

U.S. Appl. No. 12/188,258, "Non-Final Office Action", dated Dec. 27, 2012, 12 pages.

U.S. Appl. No. 13/253,173, "Non-Final Office Action", dated Apr. 16, 2013, 8 pages.

U.S. Appl. No. 13/253,173, "Notice of Allowance", dated Nov. 15, 2013, 9 pages.

U.S. Appl. No. 13/604,951, "Advisory Action", dated Dec. 1, 2015, 6 pages.

U.S. Appl. No. 13/604,951, "Final Office Action", dated Aug. 10, 2015, 34 pages.

U.S. Appl. No. 13/604,951, "Final Office Action", dated Nov. 25, 2016, 42 pages.

U.S. Appl. No. 13/604,951, "Non-Final Office Action", dated Feb. 9, 2015, 26 pages.

U.S. Appl. No. 13/604,951, "Non-Final Office Action", dated Feb. 12, 2016, 33 pages.

U.S. Appl. No. 14/176,707, "Final Office Action", dated Sep. 2, 2016, 9 pages.

U.S. Appl. No. 14/176,707, "Non-Final Office Action", dated Mar. 30, 2016, 8 pages.

U.S. Appl. No. 14/176,707, "Restriction Requirement", dated Jan. 22, 2016, 6 pages.

Advena et al., "Deposition and characterization of far-infrared absorbing gold black films", Applied Optics vol. 32, No. 7, Mar. 1, 1993, pp. 1136-1144.

Amoruso et al., "Femtosecond laser pulse irradiation of solid targets as a general route to nanoparticle formation in a vacuum", Physical Review, B71, 033406, The American Physical Society, 2005, pp. 033406-1-033406-4.

Bass et al., "Calorimetric studies of light absorption by diamond turned Ag and Cu surfaces and analyses including 4 surface roughness contributions", Journal of Applied Physics, vol. 56 No. 1, American Institute of Physics Handbook, edited by D.E. Gray, Jul. 1, 1984, pp. 184-189.

Becker et al., "Optical and electrical properties of black gold layers in the far infrared", Infrared Physics & Technology, vol. 40, No. 6, 1999, pp. 431-445.

Cassie et al., "Wettability of porous surfaces", Transactions of the Faraday Society, vol. 40, 1944, pp. 546-551.

Drelich et al., "Hydrophilic and superhydrophilic surface and materials", Soft Matter, vol. 7, 2011, pp. 9804-9828.

Eliezer et al., "Synthesis of nanoparticles with femtosecond laser pulses", Physical Review B, vol. 69, Apr. 2004, pp. 144119-1-144119-6.

Gray, "American institute of physics handbook", McGraw-Hill, New York, 3'd Ed., 1972, pp. 6-157-6-160.

Guo, "Thermal effects in femtosecond laser ablation metals", Ultrafast Phenomena in Semiconductors and Nanostructure Materials, Proc. Of SPIE, vol. 611808, 2006, 14 pages.

Hertel et al., "On the physics of material processing with femtosecond lasers", Riken Review No. 32, Focused on Laser Precision Microfabrication, Jan. 2001, pp. 23-30.

Jodlekar et al., "Optics at critical intensity: applications to nanomorphing", PNAS, vol. 101; No. 16, Apr. 20, 2004, pp. 5856-5861.

Koch et al., "Nanotexturing of gold films by femtosecond laser-induced melt dynamics", Applied Physics A 81, Applied Physics A—Materials Science & Processing, 2005, pp. 325-328.

Lehman et al., "Gold-black coatings for freestanding pyroelectric detectors", Measurement Science and Technology; D Meas. Sci. Techno!. , vol. 14, 2003, pp. 916-922.

(56) References Cited

OTHER PUBLICATIONS

Lu et al., "Micro and nano-fabrication of biodegradable polymers for drug delivery", Advanced Drug Delivery Reviews, vol. 56, No. 11, Sep. 22, 2004, pp. 1621-1633.

McDonald et al., "Femtosecond pulsed laser direct write production of nano- and microfluidic channels", Applied Physics Letters, vol. 88, 183113, 2006, pp. 183113-1-183113-3.

Nishinari, "Some thoughts on the definition of a gel", Progress in Colloid and Polymer Science, vol. 136, 2009, pp. 87-94.

Nolte et al., "Nanostructuring with spatially localized femtosecond laser pulses", Optics Letters; vol. 24, No. 13, Jul. 1, 1999, pp. 914-916.

Osipov et al., "Intracavity fabrication of nanostructures on bulk material", ICONO 2001: Fundamental Aspects of Laser-Matter Interaction and Physics of Nanostructures, vol. 4748, May 30, 2002, 4 pages.

PCT/US2007/079897, "International Preliminary Report on Patentability", dated Mar. 31, 2009, 6 pages.

PCT/US2007/079897, "International Search Report and Written Opinion", dated Sep. 29, 2008, 10 pages.

Rye et al., "The flow of liquids in surface grooves", Langmuir, vol. 12, 1996, pp. 555-565.

Thomson, "On certain curious motions observable at the surfaces of wine and other alcoholic liquors", Philos. Mag., vol. 10 No. 67 (published online on May 26, 2009), 1855, pp. 330-333.

Ursu et al., "On the role of the periodical structures induced by powerful laser irradiation of metallic surfaces in the energy coupling process", Physica, vol. 132C, 1985, pp. 395-402.

Vorobyev et al., "Colorizing metals with femtosecond laser pulses", Appl. Phy., vol. 92, 2008, 4 pages.

Vorobyev et al., "Effect of surface structural modification on absorptivity of gold in multi-pulse femtosecond laser ablation", CAOL, Sep. 12-17, 2005, 8 pages.

Vorobyev et al., "Enhanced absorptance of gold following multipulse femtosecond laser ablation", Physical Review, B 72: 195422, 2005, 5 pages.

Vorobyev et al., "Femtosecond laser nanostructuring of metals", Optics Express; vol. 14, No. 6, Mar. 20, 2006, pp. 2164-2169.

*Vorobyev, "Metal pumps liquid uphill", Applied Physics Letters 94, 2009.

Vorobyev et al., "Residual thermal effects in Al following single ns-and fs-laser pulse ablation", Appl. Phy., vol. A 82, 2006, pp. 357-362.

*Vorobyev, "Water sprints uphill on glass", Journal of Applied Physics 108, Issued 12, 2010.

*Vorobyev, "Laser turns silicon superwicking", Optics Express. vol. 18, No. 7, Mar. 29, 2010, pp. 6455-6460.

Washburn, "The dynamics of capillary flow", The Physical Review, vol. 17, 1921, pp. 273-283.

Wenzel, "Resistance of solid surfaces to wetting by water", Industrial & Engineering Chemistry, vol. 28, 1936, pp. 988-994.

Zinger et al., "Time-dependent morphology and adhesion of osteoblastic cells on titanium model surfaces featuring scale-resolved topography", Biomaterials, vol. 25(14), Jun. 2004, pp. 2695-2711.

Gould, "Smart clean surfaces", Materials Today, Nov. 2003, pp. 44-48.

U.S. Appl. No. 13/604,951, "Final Office Action", dated Jun. 1, 2018, 16 pages.

U.S. Appl. No. 13/604,951, "Non-Final Office Action", dated Nov. 20, 2017, 11 pages.

U.S. Appl. No. 14/593,465, "Non-Final Office Action", dated Mar. 2, 2018, 21 pages.

U.S. Appl. No. 14/593,465, "Restriction Requirement", dated Sep. 21, 2017, 11 pages.

Bush, et al., "Improved bio-implant using ultrafast laser induced self-assembled nanotexture in titanium", Journal of Biomedical Materials Research B: Applied Biomaterials, vol. 97B, Issue 2, Wiley Online Library (wileyonlinelibrary.com), available online Mar. 10, 2011.

Zhu, et al., "Effects of Laser-Modified Polystyrene Substrate on CHO Cell Growth and Alignment", Journal of Biomedical Materials Research B: Applied Biomaterials, vol. 70B, pp. 43-48, 2004.

U.S. Appl. No. 11/862,449, Restriction Requirement dated May 24, 2010, 8 pages.

U.S. Appl. No. 12/188,258, Advisory Action dated Apr. 23, 2012, 3 pages.

U.S. Appl. No. 12/188,258, Advisory Action dated Aug. 20, 2012, 3 pages.

U.S. Appl. No. 14/593,465, Final Office Action dated Dec. 31, 2018, 33 pages.

Long et al., Superhydrophobic and Colorful Copper Surfaces Fabricated by Picosecond Laser Induced Periodic Nanostructures, Applied Surface Science, vol. 311, Aug. 30, 2014, pp. 461-467.

Moradi et al., Femtosecond Laser Irradiation of Metallic Surfaces: Effects of Laser Parameters on Superhydrophobicity, Nanotechnology, vol. 24, No. 41, Sep. 17, 2013, pp. 1-12.

Singh et al., Femtosecond Laser Production of Metal Surfaces Having Unique Surface Structures That are Broadband Absorbers, Journal of Laser Applications, vol. 18, No. 3, Aug. 21, 2006, pp. 242-244.

Vorobyey et al., Femtosecond Laser Blackening of Platinum, Journal of Applied Physics, vol. 104, Issue 5, Sep. 10, 2008, pp. 053516-1-053516-4.

* cited by examiner

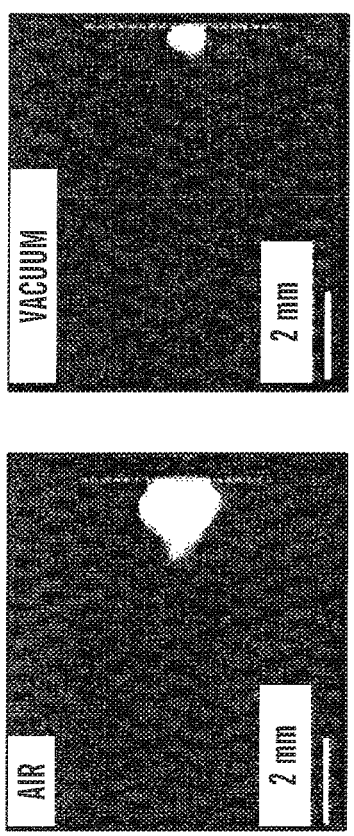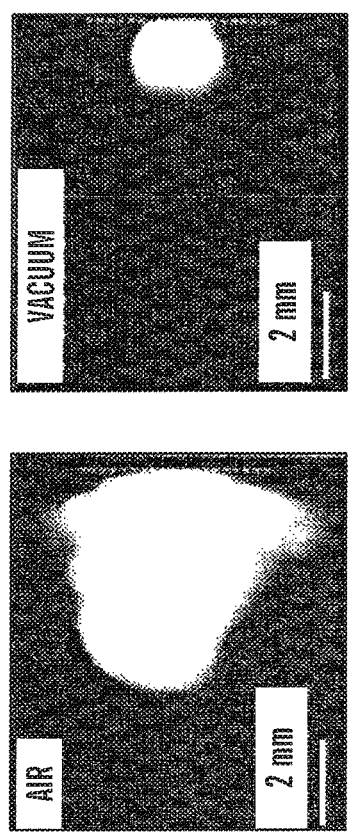

Al (FLIPSS)   25X25 mm

FEMTOSECOND LASER PULSE SURFACE STRUCTURING METHODS AND MATERIALS RESULTING THEREFROM

RELATED APPLICATION DATA

This patent application is a continuation of, and claims priority to, U.S. application Ser. No. 14/176,707 filed on Feb. 10, 2014, which is a continuation of, and claims priority to, U.S. application Ser. No. 13/253,173 filed on Oct. 5, 2011, which is a divisional of, and claims priority to, U.S. application Ser. No. 12/188,258 filed on Aug. 8, 2008, and also claims priority to U.S. application Ser. No. 11/862,449 filed on Sep. 27, 2007, as well as to U.S. Provisional Application Ser. No. 60/847,916, filed Sep. 29, 2006, the subject matters of which are herein incorporated by reference in their entireties.

FEDERALLY SPONSORED RESEARCH

This invention was made with government support under Contract No. CTS-042506 sponsored by the National Science Foundation. The government has certain rights in the invention.

BACKGROUND

1. Field of the Invention

Embodiments of the invention generally pertain to the field of materials processing and associates processed materials. More particularly, embodiments of the invention are directed to methods for processing materials using femtosecond duration laser pulses, applications of such methods, and materials and/or material properties resulting from such methods. Even more particularly, embodiments of the invention are directed to methods for altering the surface structure of metal materials using femtosecond duration laser pulses, applications of such methods, and materials and/or material properties resulting from such methods, including blackened and colored metals.

2. Description of Related Art

Although materials may be shaped or otherwise altered in a large variety of ways including milling, machining, grinding, etc., in recent years, laser-based alteration of materials has become a common method for a variety of materials processing applications. For example, laser alteration of materials by high energy laser pulses has been used to both create precise hole patterns in metals or metal films as well as for more subtle material alterations such as texturing of metals or metal films by the intense heating/melting/vaporization effects of such high energy laser beams.

Reported methods of laser alteration of materials involve the use of 'short-duration' (i.e., nanosecond (ns) and picosecond (ps)) laser pulses. See, for example, U.S. Pat. Nos. 5,635,089 and 4,972,061. U.S. Pat. No. 6,979,798 describes the use of laser pulses of preferably less than 130 femtoseconds (fs) to specifically burn metal links on integrated circuits. Thus the use of ultrashort (ns) duration laser pulses for laser processing of materials may achieve results that are different than those from longer duration (i.e., 'short') laser pulses. The duration of a nanosecond laser pulse is long enough for the pulse to interact with the material as it is ejected from the surface. Ultra-short duration, femtosecond (fs) laser pulses, by comparison, are not long enough in duration to interact with the material ejected from the surface of the irradiated substance, since the pulse ends long before the hydrodynamic expansion of the ejected material. Another difference between different laser pulse timescales is that the laser-supported combustion and detonation waves that are commonly generated in a nanosecond duration laser pulse do not occur in an ultra-short fs laser pulse, again offering up the possibility of materials processing effects and resulting material parameters that may be difficult or impossible to obtain with longer duration laser irradiation.

In light of the above observations, advantageous benefits may be obtained from the use of ultra-short, femtosecond pulses in the processing of certain materials and the altered materials or material characteristics resulting from processing with one or more fs laser pulses. Certain advantageous benefits may also be realized by the ability to controllably modify optical properties of a metal.

SUMMARY

Embodiments of the invention are directed to methods for processing materials using femtosecond duration (i.e., 1-999 fs) laser pulses, applications of such methods, and altered materials and/or material properties resulting from such methods. Particularly advantageous aspects of the invention are directed to methods for altering the surface structure of metal and other materials by application of one or more femtosecond duration laser pulses, applications of such methods, and altered materials and/or material properties resulting from such methods. According to non-limiting aspects, methods for uniformly coloring, non-uniformly coloring, and blackening a metal or other material, increasing a material's absorptance (up to nearly 100%), increasing a material's surface area, as well as altered materials exhibiting these characteristics are disclosed.

As used herein, the term "colored metal" will mean a metal having a color that is due to a femtosecond laser pulse(s)-induced nanostructuring of the surface of the metal, but not due to artificial or applied coloring, painting, dying, etching, polishing, anodizing, or other non-femtosecond laser pulse(s)-induced nanostructuring of the surface of the metal. The term "color" will have its typical meaning as well as the practical consideration that color is observable over the visible light spectrum. In that regard, however, one skilled in the art will also recognize the relationship between color and the reflectance/absorptance of light by a material, where 'white' would correspond to high reflectivity and 'black' to high absorptivity. As further used herein, the term "base metal" will mean the metal prior to femtosecond laser surface structuring as it is ready to undergo femtosecond laser pulse(s)-induced nanostructuring of the surface of the metal, in which case it may or may not be polished. According to the embodiments of the invention, the absorptance of the base metal will always be less than the corresponding absorptance of the fs laser-treated material.

BRIEF DESCRIPTION OF THE DRAWINGS

FIGS. 10A, 10B are open-shutter photographs of plasmas produced by 55 ns Nd:YAG laser pulses in 1 atm air and in vacuum at (A) F=4.7 J/cm$^2$ and (B) F=19.5 J/cm$^2$, where the laser beam is normally incident on the sample from the left (the white dashed lines indicate the front surface of the sample), according to an illustrative embodiment of the invention;

DETAILED DESCRIPTION OF EMBODIMENTS OF THE INVENTION

Embodiments of the present invention are generally directed to laser-based materials processing using one or more femtosecond duration (i.e., 1-999.99 fs) laser pulses, and to the altered materials obtained by such materials processing. As used herein, the term 'materials processing' and 'surface treatment' refer to altering the surface structure or restructuring the surface of the material being processed by creating various nanostructures that may or may not be created in combination with additional micro- and macro-structures. Non-limiting examples of nanostructured surfaces in accordance with embodiments and aspects of the invention are shown in the figures and will be described in detail below.

Material alterations obtained in accord with embodiments of the present invention may be defined by a variety of experimental methods for analyzing the alterations obtained (synonymously "the materials processing outcome(s)"); for example, by electron micrographic analysis, by spectroscopic analysis (e.g., absorption of light or other electromagnetic energy by the altered surface), and via other techniques recognized in the art. Material alterations may also be additionally and/or separately defined in terms of theoretical modeling of alterations and the mechanisms by which alterations are generated, e.g., by post-ablation redeposition of material, by the formation of nanostructure-covered, laser induced periodic surface structures (NC-LIPSS), and others described herein and known in the art.

In this regard, the term "ablation" is used to refer to material alterations generally, rather than to any specific process of material alteration. Specifically, "ablation" is defined as occurring by experimental observation, i.e., by the onset of surface damage or alteration to the material being processed, where the surface damage or alteration is typically observed by eye or by SEM analysis (see, e.g., Example 2). Thus the term "ablation" is generic, and is not used to refer to a specific physical process of material alteration, for example, the specific physical process of vaporization or other form of removal of material from a surface, etc.

The structural material alterations described herein below may be defined more precisely as, e.g., "nanostructures," "nanoscale structure," "nanoscale roughness," or "nanoroughness" obtained by femtosecond laser pulse nanostructuring of the material. Other alterations that may or may not occur in the presence of nanostructuring include, without limitation, "microstructures," "microscale structure," "microscale roughness," or "microroughness" obtained by microstructuring effects obtained by femtosecond laser pulse nanostructuring of the material, and "macrostructures," "macroscale structure," "macroscale roughness," or "macroroughness" such as craters or other features obtained by macrostructuring effects obtained by femtosecond laser pulse nanostructuring of the material.

Figure 3A:
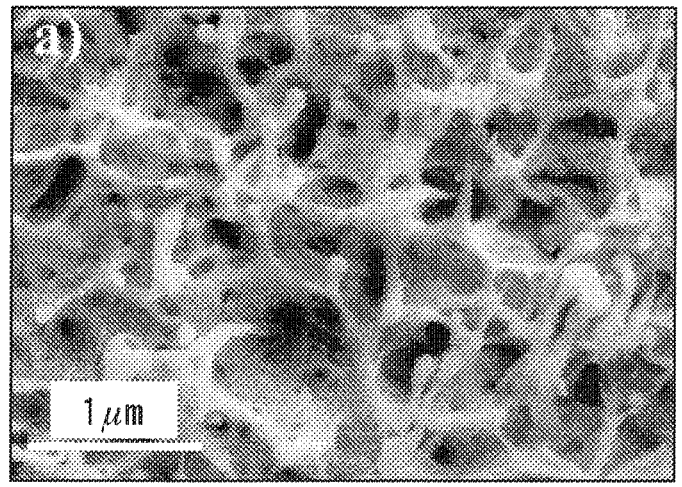
FIGS. 3A, 3B are SEM images of nanoscale surface structural features produced on a gold surface (region BC of FIG. 1) from the laser described in the legend to FIG. 1: (a) nanobranches after two shot ablation; (b) spherical nanoparticles after five shot ablation, according to an illustrative embodiment of the invention.
Figure 3B:
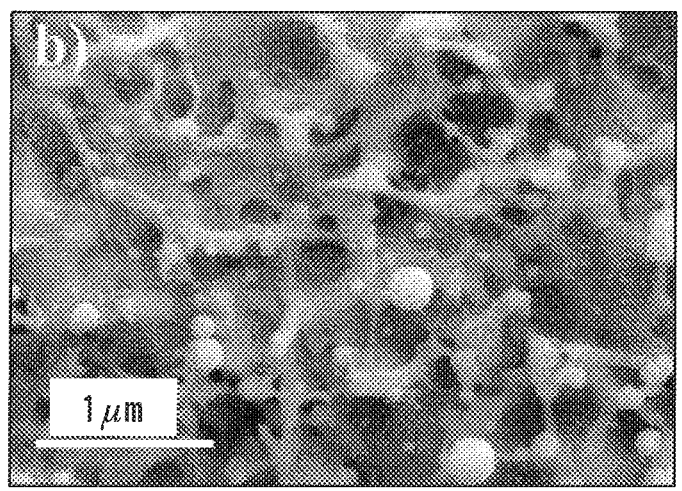
Figure 4A:
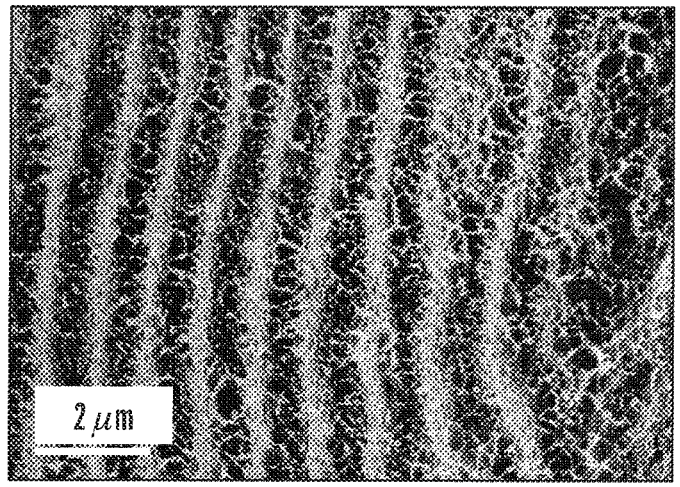
FIGS. 4A, 4B are SEM images showing nanostructure-covered, laser induced periodic surface structures (NC-LIPSS) in an irradiated area of a sample after 20,000 shots at a fluence of F=0.17 J/cm$^2$ (region CD in FIG. 1) from the laser described in the legend to FIG. 1: (a) SEM micrograph showing the period of the NC-LIPSS; (b) nanobranches and supported spherical nanoparticles in the NC-LIPSS, according to an illustrative embodiment of the invention.
Figure 4B:
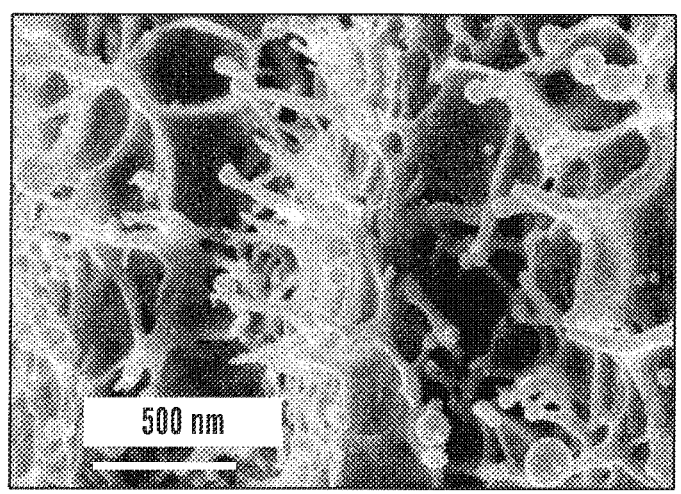
Figure 6:
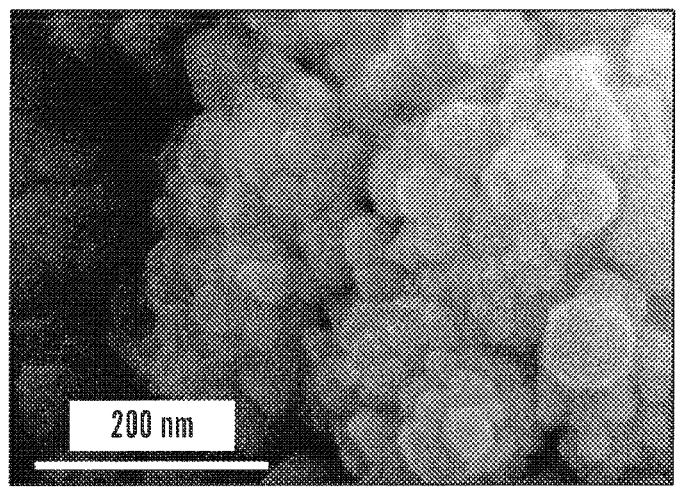
FIG. 6 is an SEM image of spherical nanoparticles in a spherical aggregate of the gold-black deposit shown in FIG. 5.

With further regard to nanostructures, terms including but not limited to "nanobranches," "nanoparticles," "nanoprotrusions," "nanocavities," "nanorims," "nanopores," nanospheres" are used to describe nanoscale dimension alterations having the visual appearances under SEM analysis of branches, particles, protrusions, cavities, spheres, channels, etc. With regard to microstructures, for example, "columnar microstructures" is used to refer to microstructures that appear visually under SEM analysis as columns (see, e.g., FIGS. 30 and 31; FIGS. 3, 6, and 26 show illustrative examples of these different micro- and nanostructures).

Further with regard to the above terms, SEM analysis may be used to establish quantitative as well as qualitative definitions for macro-, micro-, and nanostructures, and these definitions may be used to define the materials obtained by the materials processing methods according to embodiments and aspects of the invention.

In some non-limiting aspects of the invention, it may be desirable to create essentially a single kind of materials structuring, while in other non-limiting aspects it may be advantageous to create 'mixed' structuring. In this context the word "dominated" is used herein to refer to a situation where one type of structuring is prevalent, i.e., where one type of structuring occurs across, e.g. about 80% or more of the surface area of the surface produced by the specified materials processing regime. In general, however, when the surface is "dominated" by nanostructures, for example, it will be understood that other percentage values are explicitly contemplated; i.e., 70, 71, 72, 73, 74, 75 . . . 97, 98, 99% (i.e., counting by 1% intervals) of the surface area is of the structure specified.

Although the above visually-based terms are used herein to classify nanostructuring, microstructuring, and macrostructuring effects according to embodiments of the invention, other methods can be used to categorize these structures. For example, because the absorptance of a material is a function of the intrinsic absorptance, $A_{INTR}$, and the surface roughness, $A_{SR}$, alterations to a material that manifest as alterations in surface roughness may be described by absorptance changes rather than, or in addition to, descriptions of macro-, micro-, or nanostructural changes based on changes in the visual appearance. Thus Example 1 below shows in detail how different femtosecond pulse duration laser processing regimes alter absorptance, and how these alterations in absorptance correlate with macro-, micro- and nanostructural changes in the surface of the material.

Figure 1:
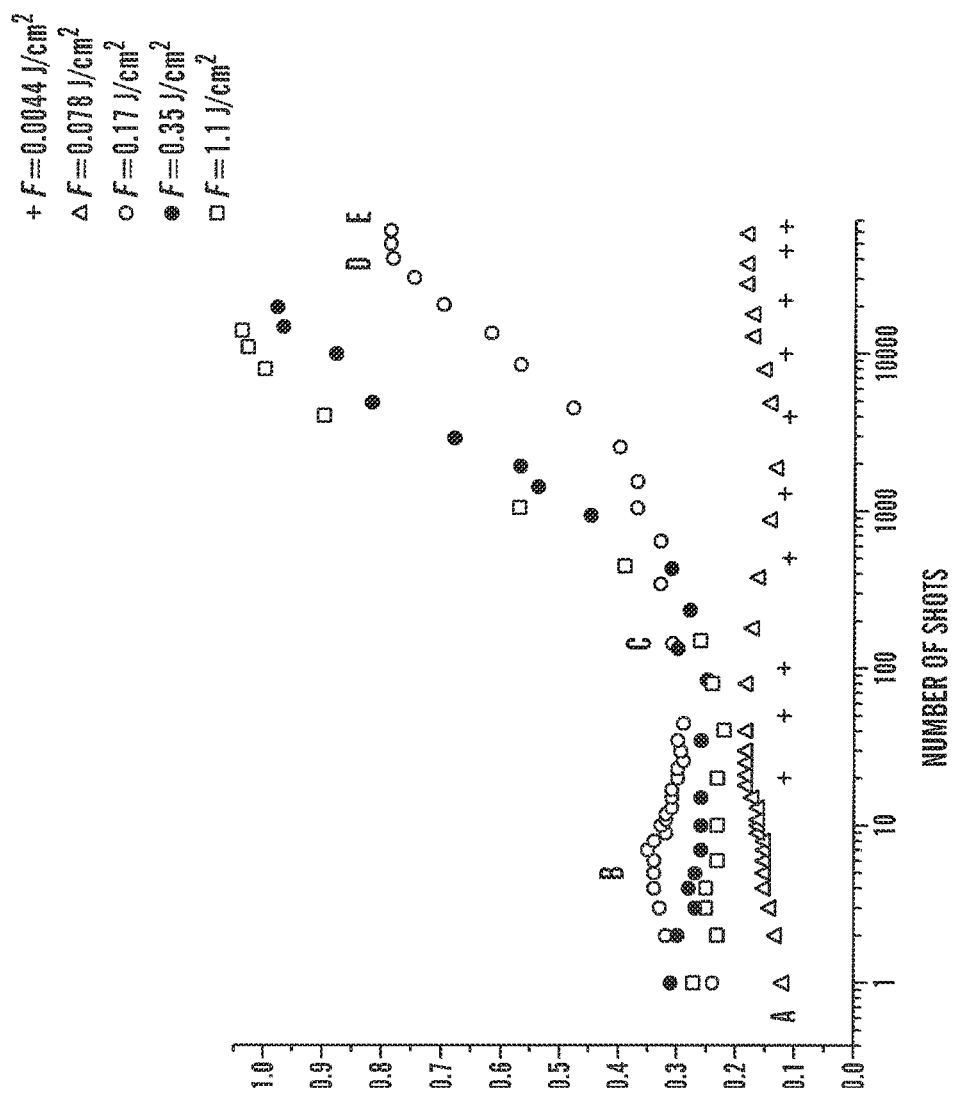
FIG. 1 is a graph that plots the absorptance of a gold (Au) surface against number of fs laser pulses of varying fluence from a Ti:sapphire laser having a central wavelength of 0.8 µm and a pulse duration of 60 fs, and further shows four regimes for absorptance change: AB, BC, CD, and DE, according to an illustrative embodiment of the invention.

Further with regard to absorptance, as discussed in Example 1 and particularly shown in FIG. 1, the materials processing regimes of the embodiments of the invention are capable of producing alterations to materials resulting in extremely high absorptivity; e.g., absorptivity for gold of close to 100%. Such high absorptivity may have particular utility in, e.g., heat absorption applications (e.g., heat exchange and heat absorption for hot water heating from solar energy, etc.). However, as FIG. 1 shows, other absorptance values may also be obtained. Thus the present invention is directed to producing materials having absorptance values from 0.01, 0.02, 0.03, 0.04, 0.05, . . . , 1.0 (counting by 0.01), where the resulting absorptance of the material is significantly greater than before processing.

The absorptance values determined in Example 1 are measured calorimetrically; however, absorptance may also be measured by other means, and specifically by methods that allow absorptance to be determined as a function of the wavelength of the light impinging on the sample. Reflectivity may also be measured in addition to, or in substitution for, absorptance, especially in situations where it is desirable to produce a material with favorably altered reflectivity. Reflectivity may be measured by any standard method used for such determinations; examples of reflectivity measurements are provided in, for example, U.S. Pat. No. 4,972,061, the contents of which are incorporated herein by reference in their entirety.

Thus in a non-limiting, exemplary aspect, materials processing methods and resulting altered or treated materials are directed to the field of jewelry. The surface of virtually any metal or metal alloy such as, but not limited to, gold, platinum, silver, stainless steel, various precious metals, decorative metals, and others may be decorated, initialed, patterned, colored, blackened, or otherwise marked via femtosecond laser surface structuring so as to have, for example, altered reflectivity ranging from the reflectivity of the unmarked metal down to essentially 0% reflectivity, depending upon the desired application. In various non-limiting aspects, reflectivity may vary with wavelength (producing different colors) and/or viewing angle.

According to the various embodiments described herein, the materials to be altered by femtosecond laser surface structuring include most generally all metals and alloys thereof, including, but not limited to, gold, aluminum, copper, platinum, titanium, tungsten, stainless steel, and others. The alteration of semiconductor materials and dielectrics are contemplated. Also contemplated are ceramic, glass, and plastic materials.

According to non-limiting aspects, metal materials are intended to include metal films (e.g., thin metal layers coated on glass, silicon or other additional underlying layer) and bulk metals. Bulk metals refer to non-thin films of more than a few hundred nm, particularly more than 1 µm, and more particularly to more than 10 µm in thickness. Thus "bulk metals" refers to metals with the characteristics just recited, whereas "thin films" refers to metals of less than a few hundred nm, including the thin films described in the Examples below.

Figure 13A:
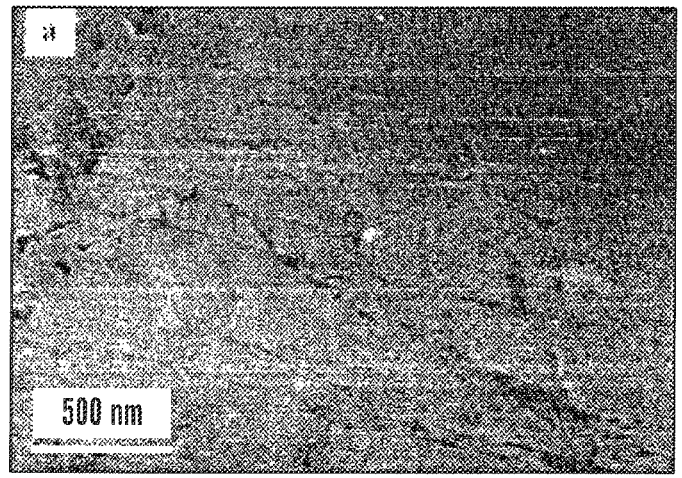
FIG. 13A is a SEM image of a mechanically polished Al surface before laser irradiation.
Figure 13B:
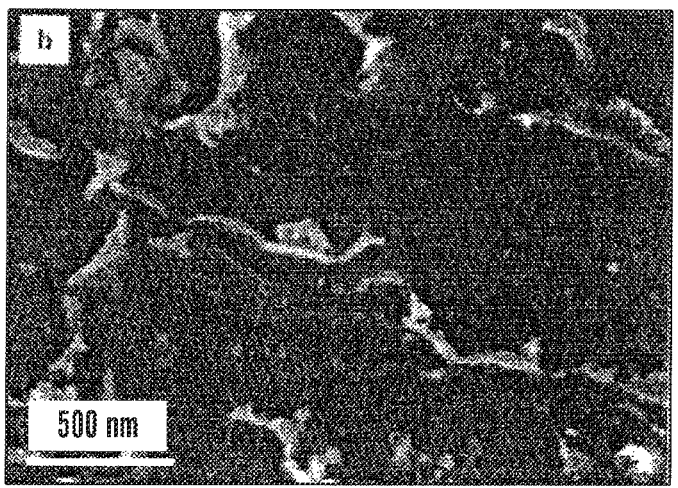
FIG. 13B is a SEM image of a typical surface modification of the Al after 1 shot at $F=F_{abl}$=0.053 J/cm$^2$ in 1 atm air using the fs laser described in the legend to FIG. 12, according to an illustrative embodiment of the invention.
Figure 14:
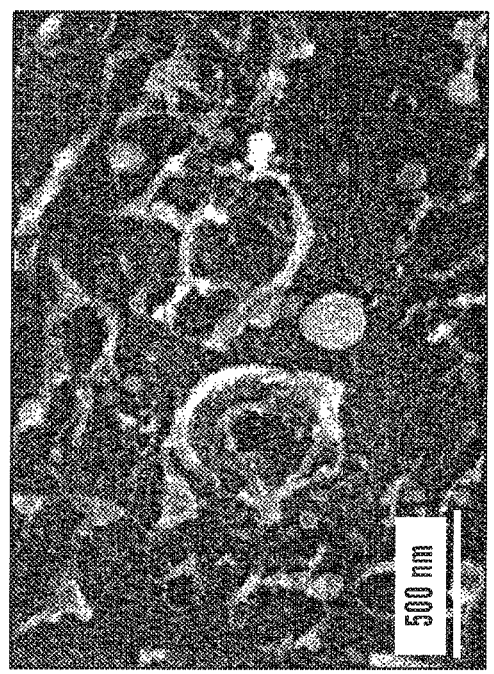
FIG. 14 is a SEM images of the Al surface after 1 shot at $F=F_{pl}$=0.086 J/cm$^2$ in 1 atm air using the fs laser described in the legend to FIG. 12, showing the number and size of spherical nanoparticles on the surface being greater than those at $F=F_{abl}$ (i.e., than in FIG. 13(B)), according to an illustrative embodiment of the invention.

Further with regard to the materials of the present invention, as shown in the Examples and in, e.g., FIGS. 13-14, there is evidence that various of the alterations of the materials obtained by the embodied materials processing methods occur preferentially on surface defects of the materials being irradiated by the femtosecond laser pulse(s). Thus in some aspects, highly polished materials will be used (pre-processing) in order to reduce the preferential formation of material alterations at material defects; in other situations, it may be advantageous to leave the material unpolished, to roughen the material, or even to introduce inhomogeneities or other "defects" into the material in order to facilitate certain alterations.

Pulse duration is a function of the laser system used. In various non-limiting embodiments, the laser system is a Ti:sapphire laser system generating 65 fs duration pulses at a central wavelength of 0.8 µm; however, other laser systems generating different fs pulse durations are also contemplated. See, e.g., U.S. Pat. No. 6,979,798 and U.S. Publication No. 2006/0207976A1, the contents of which are incorporated herein by reference in their entireties, for non-limiting descriptions of other such fs duration laser systems, e.g., a Yb-doped fiber laser such as the FPCA uJewel (available from IMRA America, Ann Arbor Mich.). Other such fs duration lasers may include, e.g., dye lasers, Cr:LiSAF lasers, KrF lasers, and others known in the art.

In addition to laser pulse duration, a number of other laser parameters may be varied in various aspects of the present invention in order to obtain the desired materials processing effects, including but not limited to: the polarization of the laser beam (typically horizontally polarized); the diameter of the spot of laser irradiation on the surface of the material sample (typically between 100 and 1200 µm); the wavelength of the laser beam; the energy density, F (fluence), of the laser beam; the number of laser pulses (shots) applied to the material sample; the extent of overlap between multiple laser pulses (shots) applied to the particular region of the material being processed; whether the shots are applied in vacuum or under higher pressure conditions, and others.

According to various non-limiting exemplary embodiments, the fs laser has a central wavelength (lambda) of 0.8 µm. However, other wavelengths in the IR, visible, ultraviolet, infrared, THz frequency, etc., may be advantageously used.

Figure 19:
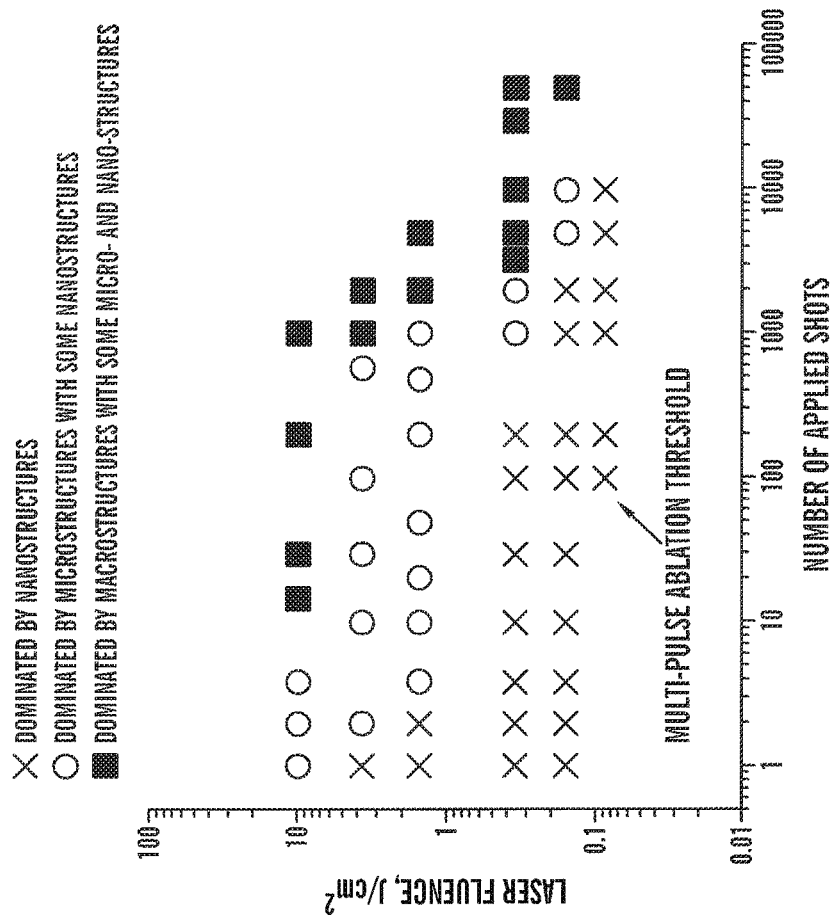
FIG. 19 shows a summary graphic of the different types of structural features observed under a SEM on a copper surface as a function of laser fluence and number of shots, derived using the fs duration laser pulses obtained from the laser described in the legend to FIG. 16, according to an illustrative embodiment of the invention.

With regard to laser fluence on the surface of the material to be processed, as will be discussed below, contemplated fluences will be sufficient to alter the surface structure of the metal as described herein and will be generally below about 25 J/cm² at the material surface; i.e., below about 25, 24, 23, 22, 21, 20, 19, 18, 17, 16, 15, 14, 13, 12, 11, 10, 9, 8, 7, 6, 5, 4, 3, 2, or 1 J/cm². The exact choice of fluence varies, however, depending upon the desired materials processing effects. Thus for example, the summary graphic of FIG. 19 shows that different materials properties may be obtained for fs laser irradiation using different combinations of laser fluence and number of laser pulses.

Further with regard to fluence, in an exemplary embodiment the choice of fluence is expressed by reference to the threshold laser fluence (synonymously, the "ablation threshold" or $F_{abl}$) required for visible material surface damage under SEM. Thus as described in the Examples, materials processing effects can be calibrated to the ablation threshold, e.g., the fluence specified to obtain a particular effect may be given both in absolute terms of J/cm² or, alternatively, may be given as a percentage of the ablation threshold, i.e., as 1, 2, 3, 4, 5, . . . , 100, 101, 102, 103, 104, 105, . . . 10,000% (counting by ones) of $F_{abl}$.

With regard to laser pulses, embodiments of the present invention may use single- and multi-pulse exposures of materials to obtain desired materials processing effects. Laser "pulse" or synonymously, "shot", refers to a single laser pulse applied to the sample material using for example an electromechanical shutter to select a single pulse. Multi-pulse or multi-shot situations involve more than a single shot, e.g., 2, 3, 4, 5, 6, 7, 8, 9, 10, etc. (counting by ones) up to thousands, tens-of-thousands, or hundreds-of-thousands of shots. The exact number of pulses or shots chosen will depend upon the desired materials processing outcome, as shown in for example in the summary graphic of FIG. 19 and as discussed below.

The extent of overlap between shots in a multi-shot situation may be varied in order to obtained desired effects, e.g., by specifying that at least x % of the area of an additional shot or shots overlap with the first or previous shot, where x can be 1 to 100% counting by ones (i.e., 1, 2, 3, 4, 5, . . . , 100%). Such variations may be particularly important when, for example, the portion of the material in the center of the irradiation by the laser pulse or pulses undergoes different alterations as a result of the centrality of the beam than portions of the material at the periphery of the pulse or pulses (see, e.g., FIGS. 18 and 22).

Figure 18:
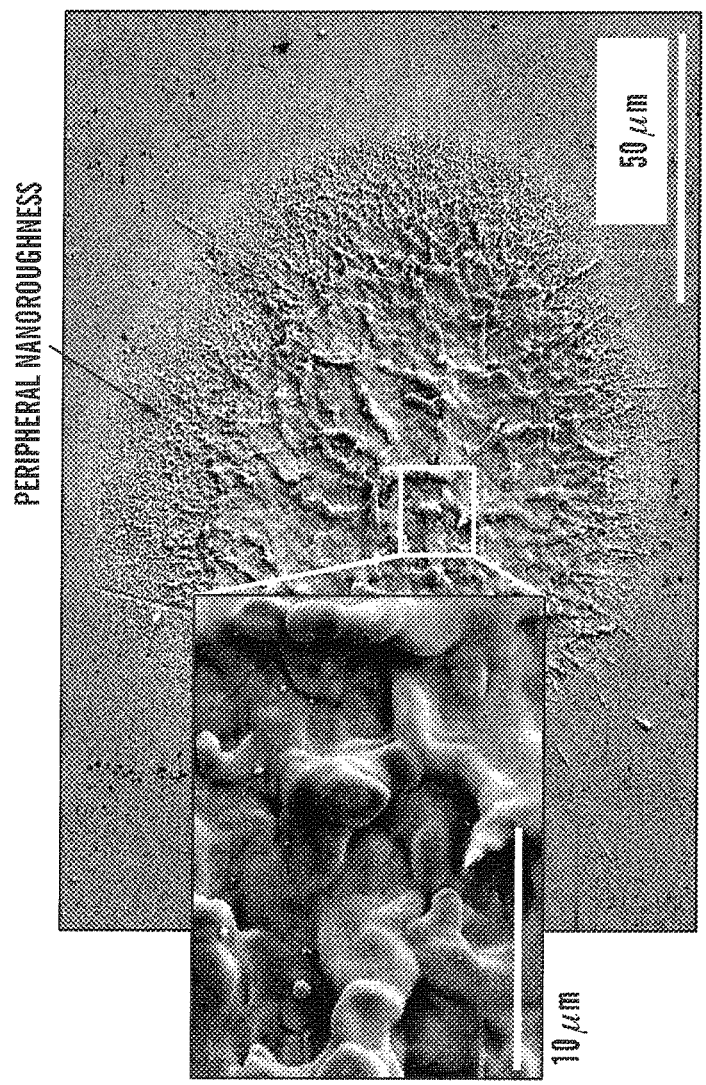
FIG. 18 shows a SEM image of copper following two shot ablation at F=9.6 J/cm$^2$ using the laser described in the legend to FIG. 16, showing only microstructures in the central area and nanostructures on the periphery of the ablated spot; the insert shows microstructural details in the central area.

As a result of shot overlap or other controllable parameters, a variable percentage of a surface may be altered to have the desired structure or structures. For example, a precise scanning pattern of a laser beam across the surface of the material may be used to ensure that a variable percentage of the surface is altered to possess the desired nanostructure(s), microstructure(s), macrostructure(s), or combinations thereof. Contemplated percentages of a surface to be modified range from 1 to 100% counting by ones (i.e., 1, 2, 3, 4, 5, . . . , 100%). As shown in FIG. 18, precise patterns of laser irradiation application, either at one fluence alone or in a combination of fluences (e.g., high fluence/low fluence) may influence the type of structuring of the material obtained. FIG. 18, for example, shows that a two shot high fluence regime at F=9.6 J/cm² on copper will produce a mixed materials processing result of a microstructured central area surrounded by a nanostructured periphery.

In addition to specifying the percentage of the surface to be modified, the materials processing effects may also be expressed in terms of a total area modified, e.g., 0.1, 0.2, 0.3, 0.4, 0.5, . . . 10,000 cm² (counting by 0.1 cm² units). In this regard, it is advantageous that the embodied materials processing methods produce sufficiently large amounts of altered materials, where these amounts may be specified in terms of the total surface area of the material that has been altered.

The exact surface area or range of surface areas required for any particular application of the present invention will depend upon the application; aesthetic applications such as jewelry, for example, will require relatively small amounts of altered material. In contrast, larger surface areas of altered materials may be required for other applications, e.g., formation of heat absorptive surfaces, or for applications for, e.g., catalysis or materials implantation into the human body for, e.g., dental implants or other situations where nanostructuring is advantageous for cellular growth and penetration into the implant material.

According to non-limiting aspects of the invention, advantageous nanostructured materials processing effects may be obtained under ambient air/pressure conditions.

Figure 12:
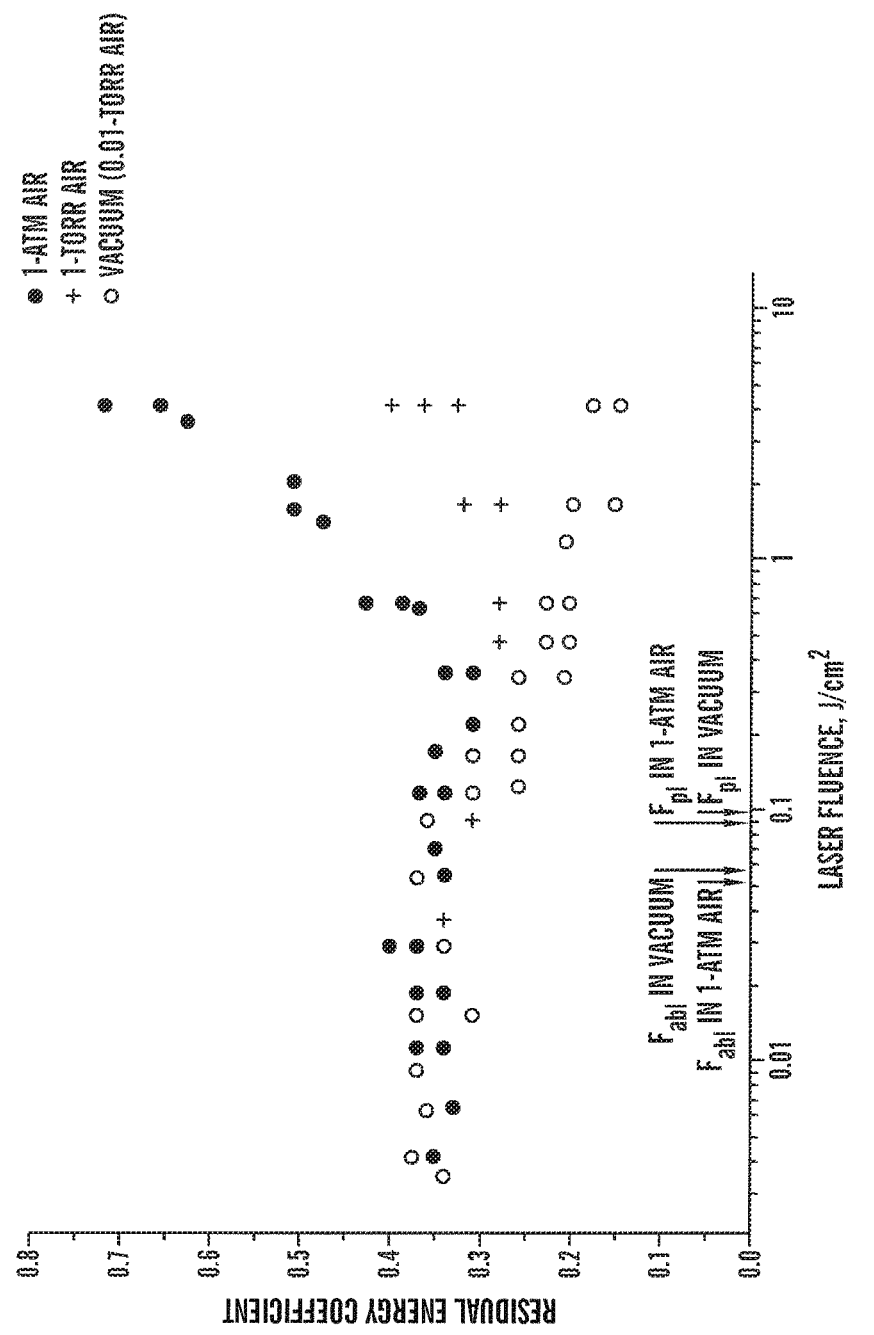
FIG. 12 is a graph of the residual energy coefficients of Al in air at various pressures versus laser fluence following single pulse fs laser ablation using a Ti:sapphire laser producing 60 fs pulses with a central wavelength of about 0.8 μm at a base vacuum pressure of about 0.01 torr, according to an illustrative embodiment of the invention.

Thus the pressure conditions under which materials processing occurs affect both the threshold laser fluence (synonymously, the "ablation threshold" or $F_{abl}$) required for visible material surface damage under SEM and the plasma ignition threshold ($F_{pl}$) as assayed by the onset of bright violet radiation from the laser-irradiated spot as measured either by a photomultiplier or an open-shutter camera (see, e.g., FIG. 12). Therefore, various embodiments of the present invention are directed to materials processing at: low-pressure conditions (e.g., below 5 torr), where, for example, related materials processing to produce "gold-black" is done; vacuum conditions (i.e., below 0.1 torr); between 5 torr and 760 torr (1 atm), i.e., 5, 6, 7, 8, 9, 10, . . . 760 torr (counting by ones); and, at atmospheric pressure, where the Examples provided below show desirable materials processing effects can occur, contrary to prior teachings that materials processing must be performed at low pressure.

Additionally, Example 2 below discusses the effects of ambient air versus a highly reactive gas (oxygen) versus an inert gas (helium) on materials processing using ns duration pulses, and concludes that these effects are dependent upon gas pressure, rather than the type of gas environment used. While these effects are expected to be applicable to fs duration pulses as well, non-limiting aspects of the present invention nevertheless contemplate the use of purified gases in addition to ambient air for use with the materials processing regimes. Inert gases may have particularly desirable effects, thus such gases or other purified gas or mixtures of gases may be used in aspects of the present invention.

Exemplary Method Embodiments

Embodiments of the invention use pulsed laser beams of femtosecond (fs) duration to obtain nanostructuring of material surfaces with or without microstructuring and/or macrostructuring effects. The specific conditions for generating a particular structure (macro-, micro-, or nano-) or combination of structures is a function of a number of variables including laser pulse duration, laser energy density or fluence (in $J/cm^2$), and the number of pulses or "shots" of the laser beam delivered to a particular region of the material to be altered.

As shown in the Examples below, both on theoretical and experimental grounds, fs pulses produce different materials processing effects than do ps and ns duration pulses. It is also observed that the materials processing effects obtained with fs laser pulses are not a priori uniform; rather, they depend in part upon the specific pulse parameters such as the energy density or fluence of the laser beam and the number of pulses of the laser beam applied to the sample. However, various combinations of beam fluence and shot number may advantageously produce more uniform materials processing results.

Figure 7A:
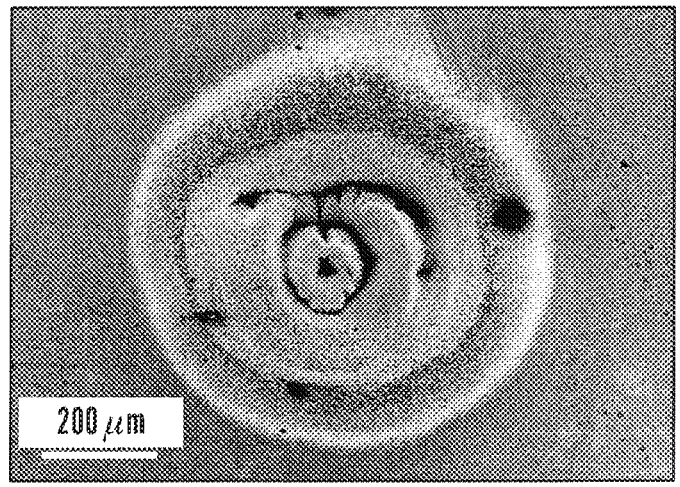
FIGS. 7A, 7B are SEM images of (A) a crater produced by 5,000 shots at F=0.17 J/cm$^2$; (B) SEM image of a crater produced by 5,000 shots at F=1.1 J/cm$^2$, according to an illustrative embodiment of the invention.
Figure 7B:
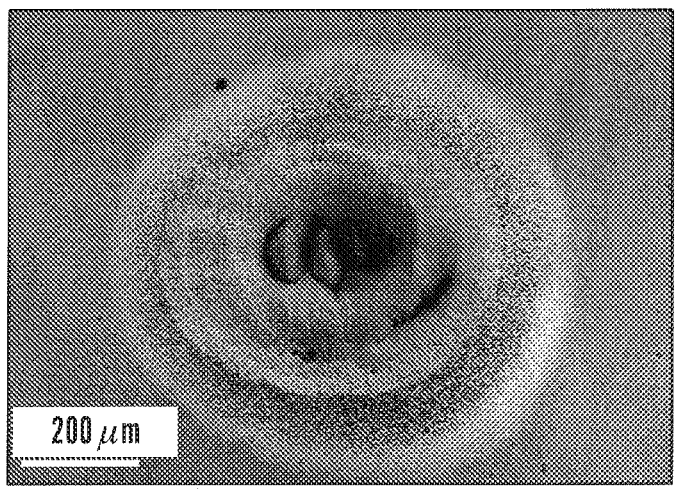

Example 1 below will describe the effects of beam fluence and shot number on a gold sample. The results are categorized into four discrete regions of effect, AB, BC, CD, and DE as shown in FIG. 1, which shows a graph of the absorptance of a gold (Au) surface against number of pulses of varying fluence from a Ti: sapphire laser (central wavelength of 0.8 μm; pulse duration of 60 fs). The different absorptance values of the laser beam irradiated gold in various of these regions can be correlated with differences in the materials alterations achieved; i.e., region AB is associated with nanoscale roughness (see also FIG. 2); region BC is associated with nanoscale roughness including nanobranches (see FIG. 3(a)) and spherical nanoparticles (see FIG. 3(b)) and also contains microscale structures such as micropores, circular microgrooves, and central microchannels; and, region CD contains macroscale structures such as craters, periodic structures, and other surface deformations (see, e.g., FIG. 7).

As Example 3 will show, the regions defined in Example 1 and shown in FIG. 1 are applicable not just to a gold material sample but are also observed to be very consistent across different materials. Thus Example 3 is specifically directed to an analysis of the effects of fluence and shot number of a fs laser beam on copper, with the SEM results for various experiments shown in FIGS. 16-18 and 20. FIG. 19 is a summary graphic that shows that there are essentially three regions defined by the data of Example 3: a region dominated by nanostructures (the X region in the figure); a region dominated by microstructures with some nanostructures (the open circle region in the figure); and, a region dominated by macrostructures with some micro- and nanostructures (the sold squares in the figure). These three regions correspond to regions AB, BC, and CD (or possibly CD/DE), respectively, of FIG. 1 and demonstrate that although there would be no a priori ability to predict the existence of these regions, once the regions have been defined, the structures formed for each region are relatively predictable.

Further confirmation of the general applicability of the three regions of FIG. 19 to other materials including, but not limited to, other metals, semiconductors, and dielectrics is provided by the data of Example 5, where titanium metal was exposed to a varying number of fs duration laser pulses of varying fluence. Specifically, Example 5 will show that nanostructures are present with low laser fluences (see, e.g., FIGS. 26-29) as expected, and that for higher fluences of, e.g., 0.16 or 0.35 $J/cm^2$ and a sufficient number of laser shots (e.g., 20-200; see FIGS. 30 and 31), microstructuring occurs as predicted by the data of FIG. 19. Finally, again as predicted by the data of FIG. 19, for 1,500 shots at a fluence of 0.48 $J/cm^2$, macrostructures are formed as predicted (see, e.g., FIG. 32(d)).

Exemplary Applications

The apparatus and method embodiments described herein may have utility in a variety of applications including, but not limited to: aesthetic or marking applications such as the application of patterning or coloring to the surface of jewelry; medical applications, e.g., for implantable medical devices, where the novel properties of the laser altered surface of such a device may aide in, for example, integration of cells of a subject into the implant; catalysis, where the properties of the altered materials and particularly the increased surface area of the materials resulting from, e.g., nanostructuring, may improve the ability of the material to catalyze chemical reactions; heat transfer situations, where alterations resulting in increased absorptivity may improve, e.g., the efficiency of solar cells and heat sinks; sensor sensitivity, where the unique alterations to materials described herein may be used in both a sensor's absorbing element to increase the amount of electromagnetic radiation absorbed and also in the shielding around the sensor or sensors to protect them from various forms of stray electromagnetic radiation, thereby helping to improve their signal-to-noise ratios; and, stealth technologies or other technologies where the absorption of electromagnetic energy such as ultraviolet, visible, infrared, terahertz radiation, etc., may cloak, conceal, or otherwise obscure the object coated or shielded with the altered material having the desired absorptive properties.

Exemplary Aesthetic or Marking Applications

A non-limiting aspect of the invention is directed to methods for materials processing that produce altered materials for aesthetic or marking applications, for example jewelry or other applications where the nano-, macro-, or micro-structuring of a material's surface may produces desired effects.

The data of Example 1 will show that fs-based laser processing may be used to increase the absorptivity of a material, which can be observed visually as darkening or blackening of the surface region of the material so altered. Accordingly, an embodiment the invention is directed to a method of obtaining the desired markings. A related embodiment is directed to the materials obtained by such processing methods.

Exemplary Biomedical Applications

A non-limiting aspect the invention is directed to a method for materials processing that produce materials advantageously suitable for biomedical applications, particularly medical applications where a metal or metal-clad device is to be implanted into a subject, and alterations to the metal or metal cladding may act to improve the biocompatibility of the metal or metal cladding.

In this aspect, suitable materials may include metals, ceramics, composites, and others, that are nanostructured and/or possibly microstructured and then introduced or implanted into a biological milieu such as in bone, in tissue, etc., where biocompatibility is important for successful introduction or implantation. The materials contemplated include any as are known for introduction or implantation into the body, and include, but are not limited to, metals such as titanium, gold, silver, etc., alloys of these metals, composites, etc. The "biological milieu" may include bone, tissue, etc., of a whole organism, or of an isolated component of an organism, e.g., of an isolated organ, teeth, bones, etc. Organisms contemplated include animals, and particularly mammals, including humans.

Example 5 below will discuss alterations to titanium metal using a fs laser method described herein to alter the surface topography of titanium for better biocompatibility, i.e., to provide a surface containing, e.g., pits, pillars, steps, etc., or other structural features that serve as anchors or other attachment, scaffolding, or stimuli for protein and/or cellular integration.

"Biocompatibility" as used herein refers generally to alterations in the surface of a material that increase the ability of that material to integrate into the body, e.g., increase structural integration such as by invasion or interpenetration of the material by cells of the body or proteins or other biological material. Biocompatibility also refers to alterations that increase integration by decreasing rejection of the material by the body, as would occur if the material fails to integrate, i.e., so that the body recognizes the material as non-integrated and thus acts to encapsidate or otherwise reject it.

Biocompatibility may be assayed in a variety of ways. For implants, for example, biocompatibility may be determined by assaying the mechanical strength or stability of the integration of the implant into the body. Thus for example, in osseointegration of dental implants, biocompatibility may be assayed by determining the force required to displace or separate out the implant from the surrounding bone. Biocompatibility may also be determined by directly observing (e.g., by SEM) the extent to which proteins, cells, or other biological materials are able to invade or integrate into the metal or other material altered by the materials processing methods of the present invention. As another non-limiting example of an assay for biocompatibility, methods for measuring cell death or proliferation may be used to determine the extent to which the altered surface topography of the material processed by the laser methods of the present invention results in the activation of cells to proliferate, or the active suppression of cell death mechanisms that would otherwise occur if the cells failed to find themselves in a suitable proliferative environment.

Exemplary Catalysis Applications

A non-limiting aspect is directed to a method for fs laser pulse materials processing that can produce materials with desirable catalytic properties; i.e., materials that contain nanostructural and macro- and/or micro-structured alterations that increase catalytic surface area.

Such alterations may be assayed by SEM or other analyses that allow for the determination of the porosity or other increased surface area aspects of the materials altered. Alternatively, catalytic activity may be measured directly by determining the rate at which a reaction is catalyzed by an unaltered material (e.g., platinum) versus the rate of the reaction using an altered material.

Exemplary Modifications of the Optical Properties of Materials

An aspect of the invention is directed to a method for altering the optical properties of materials, including, but not limited to, metals such as are provided in Example 6 below. Thus as shown in Example 6, the materials processing methods of the present invention may be used to obtain, e.g., metals which appear to the human observer to have various shades of gray (where "gray" may alternatively be defined as a material having relatively uniform reflectance across the entire visible wavelength), including multiple shades of gray in one metal piece. These materials processing methods may additionally be used to obtain what appear to the human observer to be colored materials (where "colored" may alternatively be defined as a material having preferential reflectance in some regions of the visible spectrum and not in others), e.g., colored metals such as are also described in Example 6, and 'black' metal. Although these methods are applied to metals in Example 6, the present invention explicitly contemplates the application of these methods for certain non-metal materials as well.

Example 1

Experiments in support of embodiments of the invention have demonstrated that a significant amount of residual thermal energy is deposited in metal samples following multi-shot femtosecond laser ablation. Traditionally, it was commonly believed that one of the most important advantages of femtosecond laser ablation is that the energy deposited by ultrashort laser pulses does not have enough time to move into the bulk sample; therefore, the residual thermal energy remaining in the bulk sample should be negligible. In contrast to this, a significant enhancement in laser light absorption was observed recently by the inventors following ablation. To understand the physical mechanisms of laser energy absorption, the change in absorptance of gold due to structural modifications following multi-shot femtosecond laser ablation was directly measured. The measured data indicates that there is a significant absorption enhancement due to nanostructuring in addition to the known mechanisms of absorption increase via micro- and macro-structuring. Moreover, nanostructuring alone may enhance the absorptance by a factor of about three. The physical mechanism of the total enhanced absorption is due to a combined effect of nano-, micro-, and macro-structural surface modifications induced by femtosecond laser ablation. At a sufficiently high fluence and with a large number of applied pulses, the absorptance of gold surface may reach an absorptance value of nearly 100%.

The absorptance A of a pure metal with a clean surface consists of two components $A=A_{INTR}+A_{SR}$, where $A_{INTR}$ is the intrinsic absorptance and $A_{SR}$ is the contribution due to surface roughness. For an optically smooth metal surface, $A_{SR}$ is about 1-2% of $A_{INTR}$, but the role of $A_{SR}$ enhances as the surface roughness increases. For multi-pulse ablation, only the first femtosecond laser pulse interacts with an undamaged surface, since the laser-induced surface structural modification develops long after the ultrashort pulse. In this case, A is governed by $A_{INTR}$, which can be a function of laser fluence due to laser-induced change in the dielectric constant of the material. All of the subsequent laser pulses interact with a structurally modified surface and their absorption is determined by both $A_{INTR}$ and $A_{SR}$. The absorption of a single femtosecond laser pulse by an undamaged metal surface is dominated by $A_{INTR}$. However, the coupling of laser energy to a metal in multi-pulse femtosecond laser ablation has not yet been investigated, where $A_{SR}$ may have a significant value due to surface structural modification.

The instant non-limiting example discusses the effect of surface structural modifications on the absorptance of gold in multi-pulse femtosecond laser ablation when an originally plane and smooth surface transforms into a blind hole. This effect is investigated as a function of the number of applied ablation pulses at various fluences. A reported calorimetry technique allows a direct measurement of laser energy absorbed by the sample. Our data indicate that femtosecond laser-induced surface modification enhances the sample absorptance, which can reach a value close to 100% at a sufficiently high fluence with a large enough number of applied pulses. Scanning electron microscope (SEM) studies show that there is absorption enhancement due to nanostructuring, which alone was seen to enhance the absorptance by a factor of about three.

Experimentally, an amplified Ti:sapphire laser system was used to generate 60-fs pulses of about 1.5 mJ/pulse at 1 kHz repetition rate at a central wavelength of 800 nm. The laser beam was focused onto a mechanically polished sample surface with a 40-cm-focal-length lens at normal incidence. An electromechanical shutter was used to select the number of pulses, N, applied to the sample. The absorptance of the ablated spot was studied. After ablation of the sample with a chosen number of pulses, we reduced the laser fluence to a level below the ablation threshold. Subsequently, we irradiated the ablated spot again using a train of low-fluence laser pulses that would not induce any further surface modification. A certain amount of energy from this low-fluence pulse train, $E_A$, is absorbed in the skin layer of the sample, dissipates via heat conduction in the sample, and causes a bulk temperature rise ΔT. We measured this temperature rise with a thermocouple battery that allows $E_A$ to be determined calorimetrically as $E_A=C\Delta T$, where C is the known heat capacity of the sample. To measure energy $E_I$ incident upon the sample, a certain fraction of incident pulse train energy was split off by a beam splitter and measured with a joulemeter. Having measured $E_I$ and $E_A$, the absorptance of the ablated spot could be found as $A=E_A/E_I$. Laser-induced surface modifications were then studied using a SEM and an optical microscope.

The optical properties of surface modifications were studied following multi-pulse ablation at single-pulse laser fluences of F=1.1, 0.35, 0.17, and 0.078 J/cm² in air. The ablation threshold $F_{abl}$ for a pristine surface was found to be $F_{abl}$=0.067 and 0.048 J/cm² for single-pulse and 500-pulse train irradiation, respectively. The numbers of pulses required to perforate a 1 mm-thick sample at the center of the irradiated spot were determined to be 16,100, 25,000, and 77,000 pulses at F=1.1, 0.35, and 0.17 J/cm², respectively. This corresponds to average ablation rates of 63, 40, and 13 nm/pulse, indicating that a single laser pulse produces a nanoscale modification in depth. Plots of absorptance versus the number of ablation shots, N, at different F are shown in FIG. 1. For an undamaged surface, the absorptance remains a constant value of 0.12 when measured at F=0.0043 J/cm², which is an order of magnitude below $F_{abl}$. The absorptance of a structurally modified surface is significantly greater than that of the undamaged surface and shows dependence on the number of applied ablation pulses, N.

The A(N) curves for the ablated surface can be characterized into distinct regions marked with A, B, C, D, and E on A(N) in the case of F=0.17 J/cm² in FIG. 1. The first of these four regions is region AB, where the absorptance initially increases from 0.12 (undamaged surface) to a value in the range of 0.25-0.33. Typically, this region covers the first 1-10 shots. For example, this initial enhancement of absorptance can be produced by four pulses at F=0.17 J/cm² or by one pulse at F=0.35 and 1.1 J/cm². Optical microscopy showed that the irradiated spot was entirely covered with surface modification following ablation by only one pulse when F≥0.35 J/cm², but four pulses at F=0.17 J/cm². Therefore, the enhancement of A with N at F=0.17 J/cm² appears due to both the surface modification and an increase in size of the modified area from point A to B.

In the second region, BC, the absorptance undergoes a slight decrease as N increases. Typically, this region covers approximately the next 100-300 pulses. Both regions AB and BC extend to a larger number of pulses when the surface is modified at F only slightly above $F_{abl}$, as seen from the curve at F=0.078 J/cm² in FIG. 1.

The third region, CD, is characterized by a further enhancement of absorptance with the increase of N. This region extends to N on the order of 10,000 pulses.

The fourth region, DE, was where absorptance reached a maximum value that did not change with further increase of N.

Figure 2A:
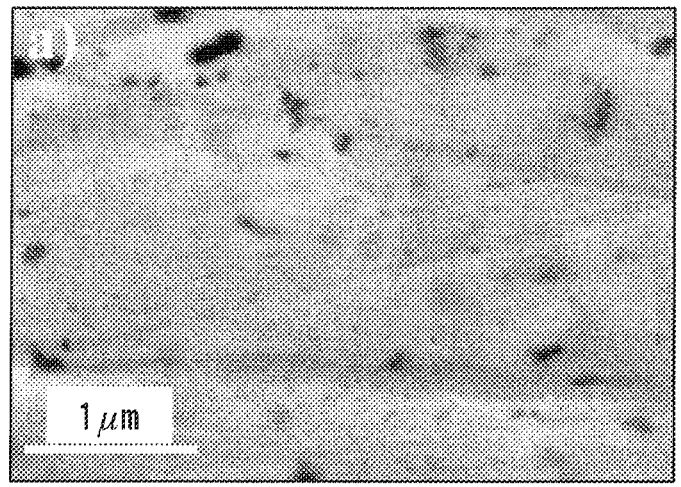
FIGS. 2A, 2B are scanning electron micrograph (SEM) images of a gold surface (a) before irradiation and (b) after one shot from the laser described in the legend to FIG. 1, showing nanoscale roughness (2B) corresponding to the region AB in FIG. 1, according to an illustrative embodiment of the invention.
Figure 2B:
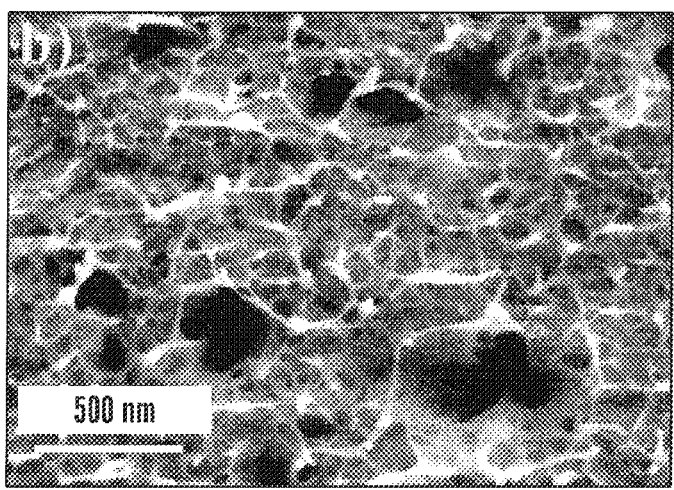

Reference is now made to the SEM pictures of surface morphology shown in FIGS. 2-6. In regions AB, BC, and CD, where absorptance exhibits dependence on N, the following surface modifications were observed: For region AB, a characteristic modification is nanoscale roughness (FIG. 2). In region BC, two major features were observed. First, nanoscale roughness develops further in the form of nanobranches (FIG. 3(a)) and spherical nanoparticles (FIG. 3(b)). Secondly, microscale structures begin to develop in the forms of micropores, circular microgrooves, and central micro-channels. In region CD, features resembling a crater with a deep central micro-channel, periodic structures with orientation in the direction perpendicular to the laser light polarization and with a period roughly equal to the laser wavelength (FIG. 4(a)), and a visible black halo around the crater were observed. All these laser-induced surface modifications can affect the absorptance in various ways. For example, surface roughness can enhance the absorption of light both by multiple reflections in micro-cavities and by variation in the angle of incidence (angular dependence of Fresnel absorption). Nanoscale structural features can affect absorptance since the optical properties of a nanostructured material can be quite different from the bulk. Laser-induced periodic surface structures (LIPSS) may enhance absorption of laser energy via generation of surface electromagnetic waves. In accordance with non-limiting aspects of the instant invention, the observed LIPSS, referred to herein as nano-structure-covered laser-induced periodic surface structures (NC-LIPSS) having non-conventional, finer nanoscale structural features, are shown in FIG. 4(b).

The absorption of laser energy in femtosecond laser ablation may also be altered through re-deposition of ablated material. Examination of the black halo produced around the crater shows that its elemental composition as determined by energy dispersive X-ray analysis is identical to that for a pristine surface; i.e., the black halo is a layer of the ablated and re-deposited gold. SEM images in FIGS. 5 and 6 demonstrate that the black halo has a structure of spherical nanoparticle aggregates that is typically seen in gold-black films and, which, have been known for their high absorptance in the infrared. Therefore, the gold-black halo can enhance the absorption of low-intensity wings of the incident Gaussian beam and contribute to residual heating of the sample. Since re-deposition of ablated material occurs both outside and within the ablated spot, the re-deposition of the nanoparticles produced by ablation can also enhance the absorption of light in the ablated area. For example, an enhanced absorption of light by a semiconductor coated with Au nanoparticles has recently been reported. Therefore, in femtosecond laser ablation, the enhanced absorption can occur due to surface nano-, micro-, macro-structures and re-deposition of nanoparticles depending on ablation conditions. The combined effect of these surface modifications can lead to virtually 100% absorption of laser light in multi-pulse ablation with a sufficiently large number of pulses at high fluence as shown in FIG. 1. Almost all of incident laser energy is retained in the sample as residual thermal energy. This suggests that the energy carried away by the ablated material is small in Au, and the enhanced absorptance appears to be the dominant factor in the enhanced residual thermal energy deposition in multi-pulse femtosecond laser ablation at large numbers of applied pulses.

Since different surface modifications are superimposed on each other, it is difficult to completely isolate and determine each individual contribution to the enhanced absorptance. Therefore, we provide the following estimations on the contributions of nano-, micro-, and macro-structures induced by femtosecond laser ablation. Since surface nano-structures are the dominant feature in region AB and part of region BC for N<50-100, and the absorptance increases from 0.12 to 0.25-0.33 over these regions (see FIG. 1), nano-structures alone are believed to account for the additional absorptance increase of about 0.1-0.2. The contribution of two microscale structures, LIPSS and random roughness, is estimated as follows. To estimate the contribution of LIPSS, we ablated a sample using p-polarized light and measured the low-fluence absorptance A(N) of the ablated spot with both p- and s-polarizations. The curves A(N) of different polarizations were identical, indicating that the grating effects of microscale LIPSS on the absorption of laser light by gold is negligible. To estimate the contribution of microscale random roughness, we abraded a mechanically polished sample surface with sandpaper to produce a rms roughness of 3 μm, which is estimated to be comparable to the laser-induced roughness for 100<N<1000. The absorptance of this abraded surface was then measured to be about 0.24 as opposed to 0.12 for a mechanically polished surface. This indirectly shows that the random micro-roughness accounts for the additional absorptance increase of about 0.12. Macro-structures come into play in two major forms, deep central channel and concentric ring grooves, when the number of pulses is between about 500-1000 and laser fluence is higher than 0.17 J/cm$^2$. Two SEM pictures showing typical macro-structure craters are presented in FIG. 7. The macroscale crater formation starts in region CD and, therefore, we believe the progressive increase of macro-structure size largely accounts for the absorptance increase from 0.4 to about 1.0. However, nano- and micro-structures also develop further in regions CD and DE and may also contribute to absorptance increase to some extent.

Besides the physical mechanisms of enhanced absorption, we also make the following observations about femtosecond laser-matter interactions: First, laser-induced nanostructures alone can enhance the absorptance of Au by a factor of about three following only 1-3 pulses. This result suggests a new direction for future study of optical properties of nanostructures imprinted on a metal surface. Secondly, we produced a new type of microscale periodic structure with much finer nanoscale structures (NC-LIPSS) following ablation with a large number of applied pulses. Thirdly, re-deposition of laser-induced nanoparticles is seen outside of the ablated spot leading to the formation of a nanostructured material known as gold black. Finally, we identified potential new applications of femtosecond laser ablation for modifying optical properties of metals and producing technologically valuable surface coatings such as, but not limited to, gold-black films.

Example 2

In this Example, a comparative study of residual thermal effects in aluminum following fs laser ablation was performed. At laser fluences above the ablation threshold where plasmas are produced and at a sufficiently high ambient gas pressure, an enhanced coupling of pulsed laser energy into the sample occurs. Furthermore, in contrast to the conventional understanding that residual thermal energy is negligible in fs-laser ablation, up to 70% of the incident pulse energy can be retained in the sample following single-pulse fs-laser ablation in 1-atm air. The major factors influencing thermal energy coupling to the sample are the laser fluence and ambient gas pressure. Residual thermal energy deposition decreases with reducing ambient gas pressure.

Laser ablation using femtosecond (fs) laser pulses has numerous applications in the field of materials processing and machining and, nanotechnology. Comparative studies have demonstrated that femtosecond laser ablation has advantages over nanosecond ablation in aspects of higher precision, reduced heat-affected zone, and smaller amount of debris around the ablated spot. Following laser ablation, a fraction of absorbed laser energy is retained in the heat-affected zone, dissipates into the bulk of the sample and remains inside as residual thermal energy that induces the bulk temperature of the sample to rise. This is sometimes referred to as the thermal load and is often undesirable in laser micro- and nano-machining.

The coupling of thermal energy into metals has been previously studied for microsecond and nanosecond laser ablation. An enhanced residual thermal energy coupling to metals has been observed when laser fluence is above a certain threshold value. It has been suggested that, in addition to the direct absorption of laser light, energy transfer from laser-produced plasma can contribute to residual heating. However, mechanisms responsible for thermal coupling are still not fully understood.

We have observed an enhanced residual heating of metals following multi-pulse femtosecond laser ablation, where laser-induced surface modification has been found to play a role in enhanced residual heating but, where this alone could not fully account for the observed amount of deposited thermal energy. To exclude the effect of surface modification on residual thermal response, we investigated single-pulse fs ablation. We also studied the residual thermal response of aluminum (Al) following ns-laser ablation to compare with the results for fs-laser ablation. We used a calorimetric technique to study effects of laser pulse duration, ambient gas pressure, and laser wavelength on residual heating of Al. To characterize the residual thermal response, we defined a so-called residual energy coefficient (REC) $K=E_R/E_I$, where $E_R$ is the residual thermal energy remaining in the sample following ablation and $E_I$ is the incident laser pulse energy. By definition, REC is equal to absorptance of the sample material when laser fluence is below the ablation threshold. Enhanced residual heating occurred following both single-pulse ns- and single-pulse fs-laser ablation in ambient gas at a sufficiently high pressure. The major factors governing the residual heating are laser fluence and ambient gas pressure. There is a fundamental difference between multi-pulse versus single-pulse ablation because multi-pulse ablation may induce absorptance change due to accumulated surface modifications from multiple laser shots. This accumulated effect does not occur in single-pulse ablation.

Both ns and fs duration pulse effects were examined. The following three laser systems were used: 1) a ruby laser producing 45-ns pulses (FWHM) at wavelength $\lambda=0.69$ μm with pulse energy of 0.6 J; 2) a Nd:YAG laser generating 55-ns pulses at $\lambda=1.06$ μm with pulse energy of 1.4 J; and, 3) a Ti:sapphire laser producing 60-fs pulses at $\lambda=0.8$ μm with pulse energy of 1.5 mJ. Using each laser system, the laser beam was focused onto an Al sample at normal incidence. A fraction of the incident pulse energy $E_I$ was split off using a beamsplitter and measured with a joulemeter to allow $E_I$ to be determined.

The residual energy $E_R$ that remains in the sample following ablation causes the bulk temperature of the sample to rise by $\Delta T$. Using a thermocouple attached to the Al sample, $\Delta T$ was measured after thermal equilibrium was reached in the sample. Knowing the specific heat capacity $c_p$ and the mass m of the sample, the residual energy can be obtained from $E_R=mc_p\Delta T$. The thermocouple response time (the time required for achieving a maximum thermocouple signal in our calorimeter) was about 2.5 sec. Using measured $E_I$ and $E_R$, the residual thermal energy coefficient $K=E_R/E_I$ can be found as a function of single-pulse laser fluence $F=E_I/S$, where S is the laser beam area on the sample. The samples were mechanically polished. Measurements were performed in various ambient gases and at different pressures. The sample was translated with an X-Y stage so each subsequent laser pulse was incident on a fresh spot. Two parameters, the ablation threshold $F_{abl}$ and the plasma ignition threshold $F_{pl}$, were determined at the onset of surface damage visible to eye with subsequent examination under a scanning electron microscope (SEM). $F_{pl}$ was determined by observing the onset of bright violet radiation from the irradiated spot using either a photomultiplier (PMT) or an open-shutter camera, both properly filtered to cut off scattered laser light.

Figure 8:
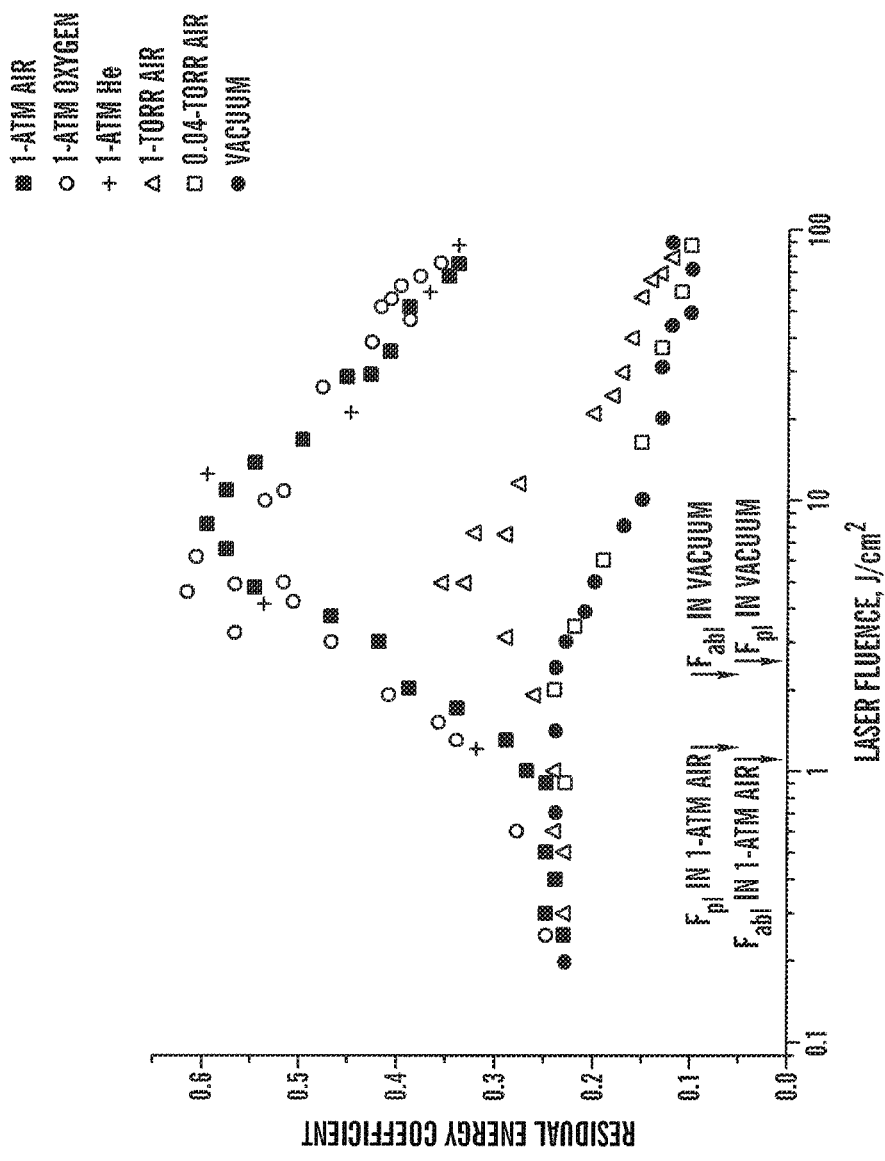
FIG. 8 is a graph of the residual energy coefficients of aluminum (Al) versus laser fluence following ablation with a single 55 ns pulse of a Nd:YAG laser at various ambient gas conditions, presented for illustrative effect.
Figure 9:
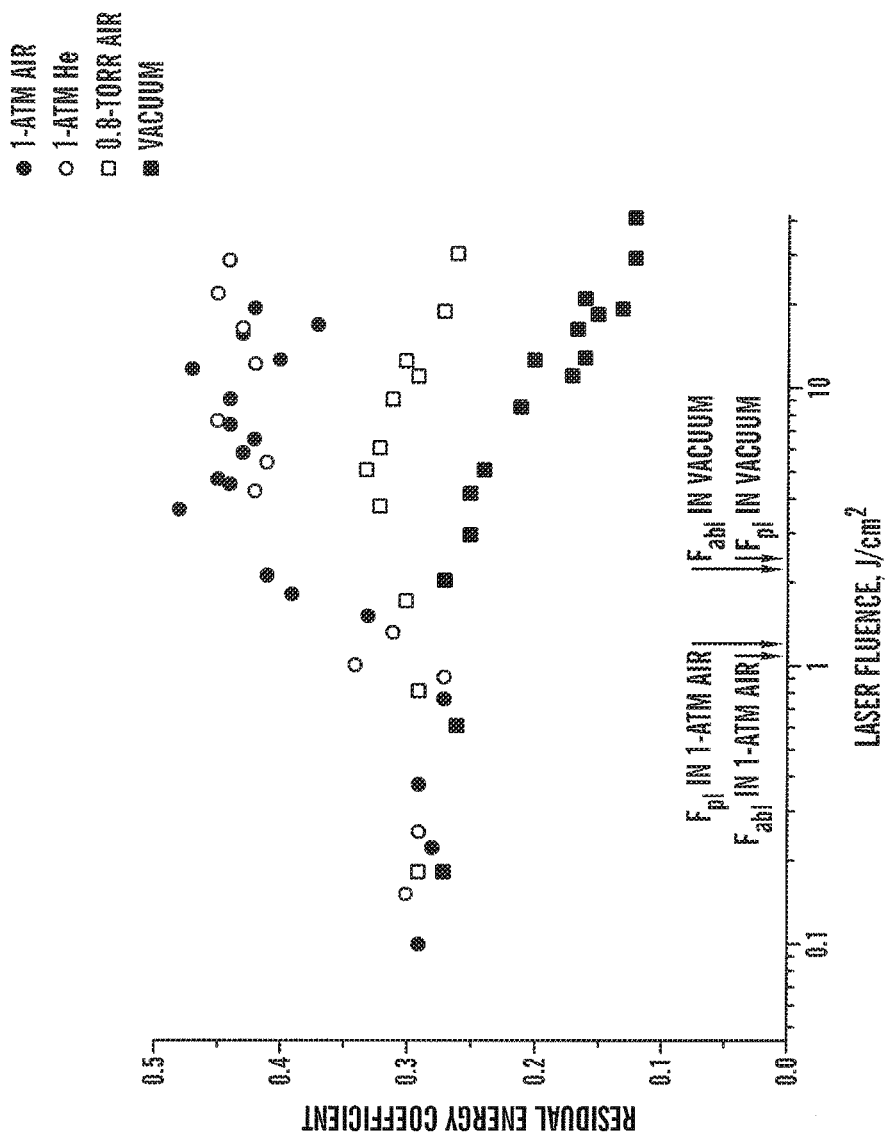
FIG. 9 is a graph of the residual energy coefficients for aluminum versus laser fluence following ablation with a single 45 ns pulse of a ruby laser at various ambient gas conditions, presented for illustrative effect.

Although embodiments of the invention are directed to fs-duration laser pulses, this Example probes some of the effects of both fs- and ns-duration laser pulses. The dependence of REC on laser fluence F following single-pulse ns-laser ablation in various ambient gases under different pressures on Al are plotted in FIG. 8 (for Nd:YAG laser) and 9 (for ruby laser). For the Nd:YAG laser, ablation and plasma ignition thresholds in 1-atm air are determined to be $F_{abl}=1.2\pm0.3$ J/cm² and $F_{pl}=1.4\pm0.4$ J/cm². For the ruby laser, these values are $F_{abl}=1.0\pm0.2$ J/cm² and $F_{pl}=1.1\pm0.3$ J/cm². Thus $F_{abl}\approx F_{pl}$ in these experiments. By definition, REC should be equal to the absorptance of the material when it is irradiated by low-fluence laser light that does not cause any surface modification. The measured value of REC (K=0.25) at $F<F_{abl}$ in FIG. 2 agrees with the reported value of absorptance for a mechanically polished Al sample at $\lambda=1.06$ μm (D. E. Gray (Ed.): *American Institute of Physics Handbook,* 3rd edn. (McGraw-Hill, New York, 1972)), and this agreement shows the accuracy of our measurement technique. Data at 1-atm in FIGS. 8 and 9 show that REC enhances abruptly at a certain fluence threshold, $F_{enh}$, and reaches a maximum value of about 0.5-0.6 indicating that about 50-60% of the laser pulse energy can be retained in Al following nanosecond laser ablation. Our experiment also shows that $F_{enh}\approx F_{pl}$ within the experimental uncertainty for both Nd:YAG and ruby laser ablation.

Next, we studied the pressure effect on REC; representative curves are plotted in FIGS. 8 and 9. For Nd:YAG laser ablation, REC slightly decreases when air pressure, P, decreases from 1 atm to about 30 torr, but REC abruptly drops when pressure further reduces from 30 torr to about 0.6 torr. For P<0.6 torr, the onset of plasma is accompanied with a drop of REC. This drop becomes more pronounced as the pressure is further reduced to 0.04 torr. At this pressure, REC eventually reaches a value of about 0.12 that is smaller than the absorptance of an undamaged surface by a factor of two. For P<0.04 torr, REC virtually remains independent of the residual air pressure. This behavior shows that, in contrast to the observation in air, the onset of plasma in vacuum is accompanied by a drop of REC. In vacuum, both $F_{abs}$ and $F_{pl}$ are higher than those at 1-atm air pressure by approximately a factor of two. Dependence of REC on laser fluence is also studied in 1-atm oxygen and 1-atm helium, and these REC data are shown in FIGS. 8 and 9. The dependences show virtually the same behavior as those in air, indicating that REC does not essentially depend on the particular type of gas. The contribution of possible exothermic chemical reactions that may occur due to presence of chemically active gases such as oxygen is negligible.

In vacuum, the laser plasma mainly consists of ionized species of ejected material, while in a gas medium, plasma consists of ionized species of both ablated material and ambient gas. A characteristic feature of ambient gas plasma produced by ns pulses is that the plasma expands due to the generation of laser-supported absorption waves. FIG. 10 shows open-shutter photographs of plasmas produced by 55-ns Nd:YAG laser pulses for ablation of Al in both air and vacuum under the same experimental conditions. Distinction between plasmas can be clearly seen. The size of plasma in air is larger than that in vacuum. Therefore, the role of plasmas in residual heating of the sample in air may differ from that in vacuum.

Figure 11A:
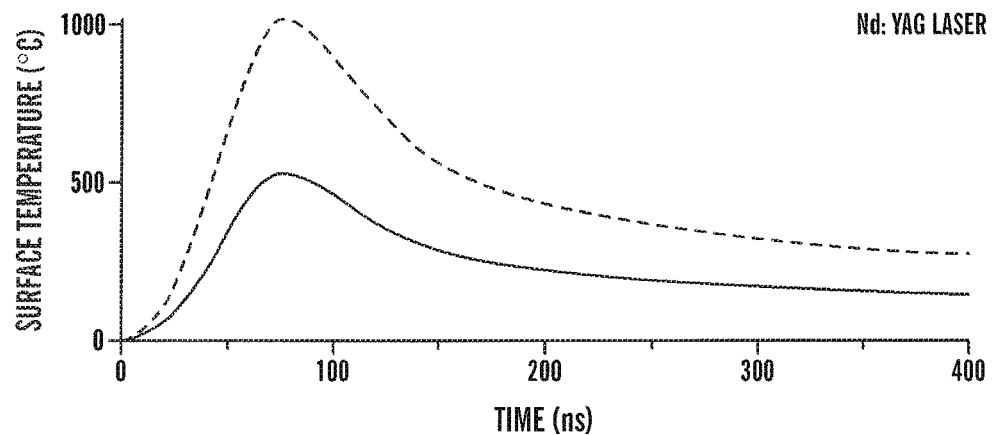
FIG. 11A is a graph of estimates of surface temperatures of Al samples for a Nd:YAG laser pulse at $F_{abl}$ approximately equal to $F_{pl}$=1.4 J/cm$^2$ in 1 atm air (solid line) and at $F_{abl}$ approximately equal to $F_{pl}$=2.7 J/cm$^2$ in vacuum at a base pressure of 0.01 torr (dotted line)
Figure 11B:
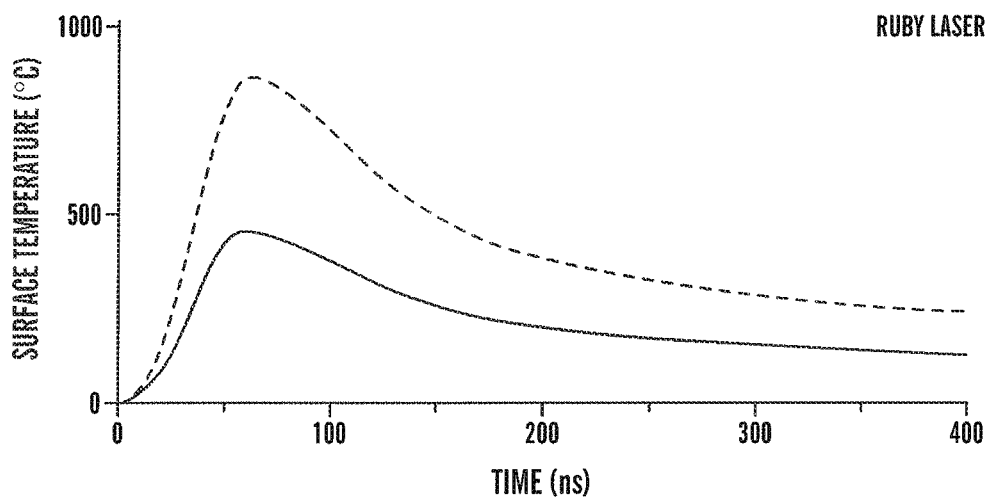
FIG. 11B is a graph of estimated surface temperatures of Al samples for a ruby laser pulse at $F_{abl}$ approximately equal to $F_{pl}$=1.1 J/cm$^2$ in 1 atm air (solid line) and at $F_{abl}$ approximately equal to $F_{pl}$=2.1 J/cm$^2$ in vacuum at a base pressure of 0.01 torr (dotted line), according to an illustrative embodiment of the invention.

The direct absorption of laser energy is a factor that may influence residual heating. According to the Drude model, when the temperature increases material absorptivity should also increase due to an enhanced collision frequency between free electrons and thermally vibrating lattice atoms. Therefore, one should expect an increase in REC with laser fluence due to this enhancement of material absorptivity. However, the fact that REC increases in air while it decreases in vacuum above a certain laser fluence indicates that the temperature-enhanced Drude absorption does not play an essential role in enhanced residual thermal response. This is also confirmed by our estimation of the laser-induced surface temperature using the following formula:

$$T_S(t) = \frac{A\sqrt{a}}{k\sqrt{\pi}} \int_0^t \frac{I(t-\theta)}{\sqrt{\theta}} d\theta + T_0$$

where A is the absorptance, a is the thermal diffusivity, I is the intensity of incident laser light, k is the thermal conductivity, t is the time, $T_0$ is the initial temperature, and θ is the integration variable. FIG. 11(a) shows the computed $T_S(t)$ induced by the Nd:YAG laser pulse at $F_{abl} \approx F_{pl} = 1.4$ J/cm$^2$ in 1-atm air and at $F_{abl} \approx F_{pl} = 2.7$ J/cm$^2$ in vacuum with A=0.25, a=1.0×10$^{-4}$ m$^2$/s, k=240 J s$^{-1}$ m$^{-1}$° C.$^{-1}$, and $T_0$=20° C. One can see that the maximum surface temperature is about 500° C. in air and 1000° C. in vacuum. The estimated surface temperature in air is below both the melting (660° C.) and boiling (2495° C.) points of Al. The computed $T_S(t)$ for ruby laser at $F_{abl} \approx F_{pl} = 1.1$ J/cm$^2$ in 1-atm air and at $F_{abl} \approx F_{pl} = 2.1$ J/cm$^2$ in vacuum with A=0.28 are shown in FIG. 11(b). Similar to the results of Nd:YAG laser in FIG. 5(a), the estimated surface temperature for ruby laser irradiation in air is also below both the melting and boiling points of Al. Thus when the enhanced thermal coupling occurs in 1-atm air, the estimated surface temperature induced by both Nd:YAG and ruby lasers is too low to induce a significant increase in absorptance.

The similar general behavior of REC for Nd:YAG (λ=1.06 μm) and ruby (λ=0.69 μm) lasers shows that laser wavelength is relatively unimportant in the visible and near infrared spectral region. Nevertheless, our experiment clearly demonstrates that REC of the aluminum sample depends mainly on laser fluence and ambient gas pressure following ns-laser ablation.

Figure 15:
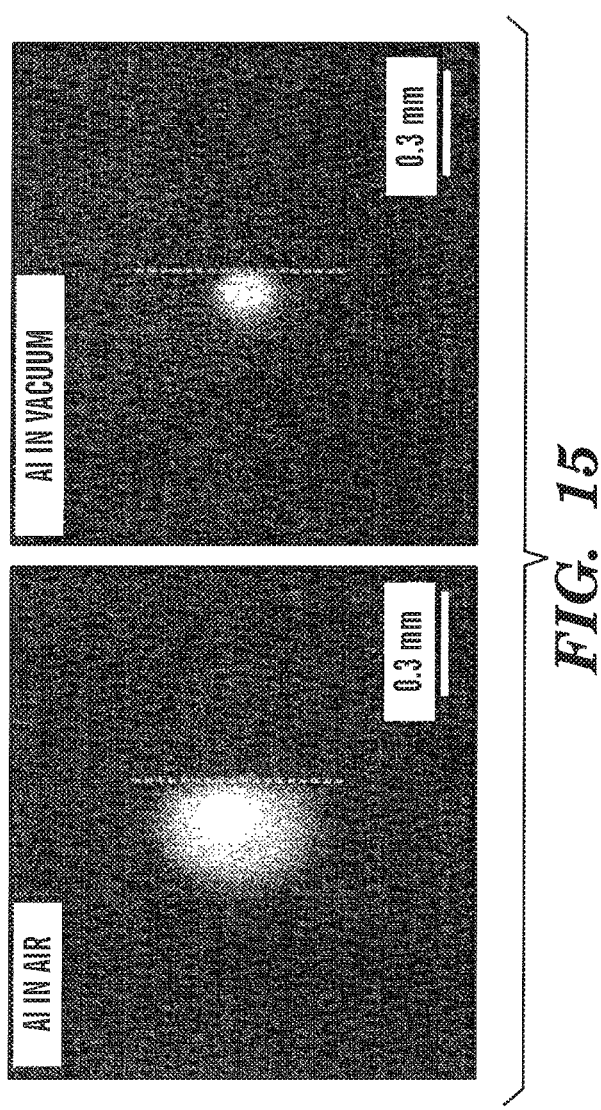
FIG. 15 shows open shutter photographs of plasma produced by a single fs laser pulse at F=1.16 J/cm$^2$ in vacuum (pressure of about 0.01 torr) using the laser described in the legend to FIG. 12, where the laser beam is normally incident on the target from the left (the white dashed line indicates the front surface of the sample), according to an illustrative embodiment of the invention.

The dependence of REC on laser fluence for Al following fs-laser ablation in 1-atm air and in vacuum (P=0.01 torr) are plotted in FIG. 12. The residual thermal energy coupling is enhanced in air above a certain threshold value of laser fluence, while in vacuum it is reduced. The values of $F_{abl}$, $F_{pl}$, and $F_{enh}$ in air are found to be 0.053 J/cm$^2$, 0.086 J/cm$^2$, and 0.5 J/cm$^2$, respectively. These thresholds are well separated and the enhancement threshold is above the plasma threshold; i.e. $F_{enh} > F_{pl} > F_{abl}$, in contrast to the ns-laser ablation where $F_{enh} \approx F_{pl} \approx F_{abl}$. We note that our measured value of $F_{pl}$ in 1-atm air agrees with reported values for Al thin film deposited on a silicon substrate. The values of $F_{abl}$ and $F_{pl}$ in vacuum are determined to be 0.058 J/cm$^2$ and 0.096 J/cm$^2$, respectively (see FIG. 12). Contrary to conventional understanding that the residual thermal energy is negligible in an ablated sample following femtosecond laser ablation, our data show that REC reaches a value of 0.7 indicating that, at the highest laser fluence achievable in our experiment (F≈4 J/cm$^2$), about 70% of the incident laser energy can be retained in the sample following single-pulse fs-laser ablation in 1-atm air FIG. 13(a) shows an SEM image of an undamaged surface that is mechanically polished. A view of the sample surface after irradiation in air at $F=F_{abl}$ is shown in FIG. 13(b). (FIG. 13(b) does not show the same spot on the sample as in FIG. 13(a)). FIG. 13(b) shows that surface defects are preferential spots for initial ablation with some sparsely distributed small spherical nanoparticles in the irradiated area. FIG. 14 shows a typical laser-induced surface morphology following ablation at $F=F_{pl}$ in 1-atm air. It is seen that surface modifications are still localized around surface defects, but both the number and the size of nanoparticles are greater than those at $F=F_{abl}$. Therefore, material ejection in fs-laser ablation appears to be initiated at surface defects. Open-shutter photographs of the femtosecond laser-induced plumes taken at F=1.16 J/cm$^2$ (higher than $F_{pl}$) are shown in FIG. 15. The figure shows that the size of the plume in air is larger than that in vacuum (P=0.01 torr).

There are three basic distinctions between ns- and fs-laser ablation. First, fs-laser pulses do not interact with ejected material because hydrodynamic expansion of ablated material from the irradiated area occurs on a timescale much longer than femtosecond pulse duration. Secondly, laser-supported absorption waves that are commonly generated in ns-laser ablation in a gas medium do not exist in fs-laser ablation. Thirdly, a material irradiated with an intense fs-laser pulse can be heated to a solid-density plasma state.

Example 3

Unique properties of nanomaterials have been extensively studied in the past and various nanostructures have found numerous applications in optics including enhanced x-ray emission and enhanced absorption in intense light-matter interaction, and optical biosensing, to name a few. Direct surface nanostructuring (i.e., not from ablated plume deposition) may be used in a number of technological applications, for example, manipulation of optical properties of solids, catalysts, dental implants, etc. We performed a detailed study of the morphology of surface nanomodifications produced on bulk metals using a femtosecond laser ablation technique embodied herein. The effects of laser fluence and number of applied pulses on the generated surface nanostructures were studied with a scanning electron microscope (SEM). According to an aspect, a set of optimal laser irradiation conditions for metal surface nanostructuring is disclosed.

In our experiment, we used an amplified Ti:sapphire laser system that consisted of a mode-locked oscillator and a two-stage amplifier including a regenerative amplifier and a two-pass power amplifier. The laser system produces 65-fs pulses with energy around 1 mJ/pulse at a 1 kHz repetition rate with a central wavelength λ=800 nm. To produce ablation, the laser beam is focused normally onto a bulk sample mounted vertically. To measure the incident pulse energy, a certain fraction of the incident light is split off by a beam splitter and measured with a pyroelectric joulemeter. The number of laser shots, N, applied to the sample is controlled using an electromechanical shutter. All experiments were performed in air under atmospheric pressure. The morphology of femtosecond laser-induced surface modifications was studied using a SEM. The studied samples were mechanically polished copper, gold, and platinum. The range of laser fluence used in the ablation was between 0.084 and 9.6 J/cm$^2$. The number of applied pulses was varied from 1 to 5×10$^4$ shots. The ablation threshold was determined as the minimum fluence to generate a surface damage seen under the SEM.

Figure 16B:
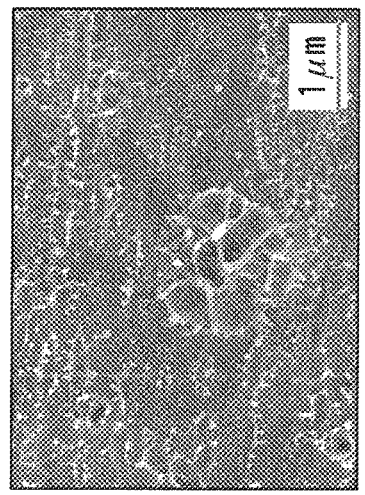
FIGS. 16(A-D) are SEM images of nanoscale structures in the center of the irradiated spot on a copper sample following ablation at F=0.35 J/cm$^2$ using a Ti:sapphire laser with a central wavelength of 0.8 μm and a pulse duration of 65 fs: (A) sample surface before irradiation; (B) a different area of the copper surface after one shot ablation showing random fine nanostructures in the form of nanoprotrusions, nanocavities, and nanorims; (C) after two shot ablation; (D) after 1,000 shot ablation, according to an illustrative embodiment of the invention.
Figure 16D:
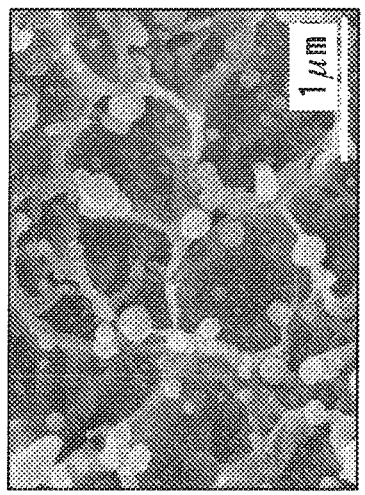
Figure 16A:
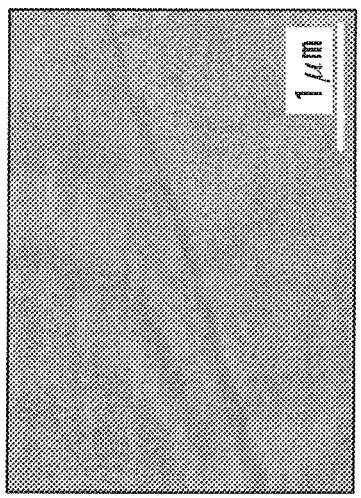
Figure 16C:
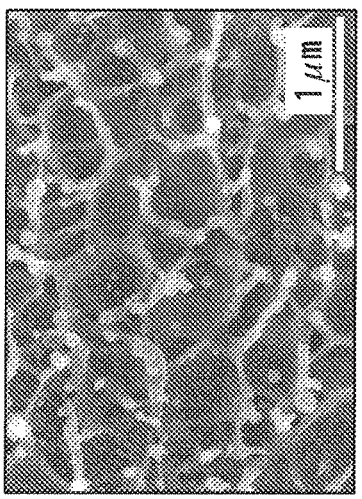

A SEM picture of a copper sample surface prior to laser irradiation is shown in FIG. 16(a). For reference, the ablation threshold for a copper sample was determined to be $F_{abl}$=0.084 J/cm² following a total of N=100 shots. The morphology of the irradiated surface was studied following ablation with laser fluence of F=0.084, 0.16, 0.35, 1.52, 3.7, and 9.6 J/cm² and the number of applied pulses in the range of 1-5×10⁴. A number of representative surface structures produced on the copper sample are shown in FIGS. 16-18. An analysis of the SEM data shows that the morphology of femtosecond laser-induced surface nanostructures depends both on laser fluence and the number of applied pulses. The effect of the total number of shots on nanostructuring at F=0.35 and 1.52 J/cm² is shown in FIGS. 16 and 17, respectively. FIG. 16(b) shows that nanostructures begin to occur on some random localized sites after one shot at F=0.35 J/cm². A few larger-size structural features are also observed in the central part of the ablated area, as seen in FIG. 16(b). These larger structures may be associated with surface defects and/or laser beam intensity inhomogeneities. FIG. 16(c) shows a nanoscale surface structure produced by two-shot ablation. The structure comprises both larger nanocavities and nanoprotrusions with spherical tips of diameter up to about 75 nm Therefore, the one additional shot transforms the sparsely distributed nanoscale features in FIG. 16(b) to the cellular-like structures in FIG. 16(c). The surface morphology after ablation with 1000 pulses is shown in FIG. 16(d). One can see that the mean size of nanoprotrusions becomes larger while at the same time some nanocavities develop into microcavities. The evolution of the surface structures following ablation at F=1.52 J/cm² and various N is shown in FIG. 17(a-d). At this middle fluence, pure nanostructures are only generated by ablation with one or two laser shots (FIGS. 17(a) and 17(b)). As shown in FIG. 17(c), 10 shot ablation produces both random nano- and micro-structures. With further increasing N, the proportion of nanostructures decreases as can be seen in FIG. 17(d), where microscale structures become dominant. At the highest fluence used in our experiment, nanostructures are not present over most of the irradiated area and a dominant morphological feature is microroughness. However, nanostructuring can still be observed on the periphery of the ablated spot where the Gaussian beam intensity is low enough for nanostructural formation. An example of these surface structural modifications is shown in FIG. 18 for two-shot ablation at F=9.6 J/cm².

Figure 17B:
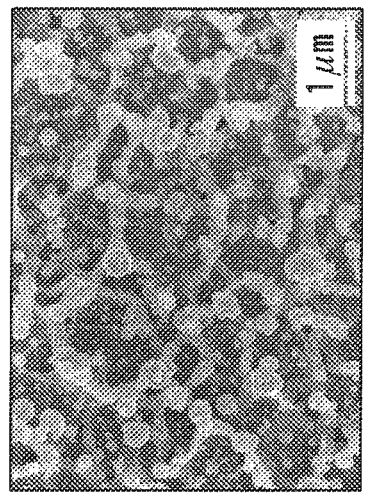
FIGS. 17(A-D) show SEM images of the central part of the irradiated spot on copper following ablation at F=1.52 J/cm$^2$ using the laser described in the legend to FIG. 16: (A) surface after one shot exhibiting random nanostructures in the form of nanoprotrusions and nanocavities; (B) surface after two shot ablation showing random nanostructures in the form of spherical nanoprotrusions and nanocavities; (C) surface after 10 shots showing both nano- and microstructures; (D) surface after 1,000 shots showing predominantly microstructures, according to an illustrative embodiment of the invention.
Figure 17D:
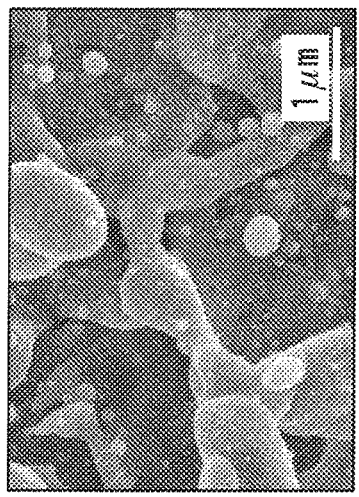
Figure 17A:
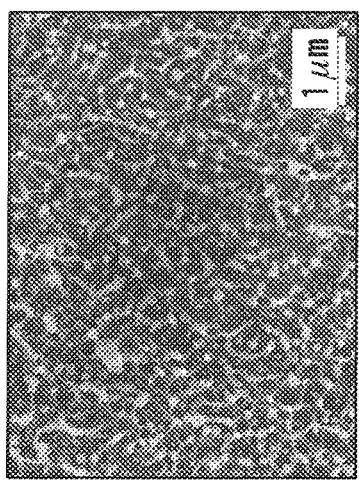
Figure 17C:
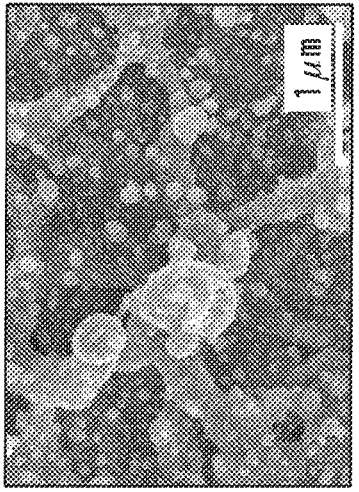

The effect of laser fluence on surface structuring can be seen from analyzing the surface modifications produced at various F and fixed N as shown for example in FIG. 16(c) (F=0.35 J/cm², N=2), FIG. 17(b) (F=1.52 J/cm², N=2) and FIG. 18 (F=9.6 J/cm², N=2). These images show that ablation with high laser fluence does not actually induce nanostructures and therefore there exist optimal laser ablation conditions for surface nanostructuring. In order to determine the optimal conditions for nanostructuring, we performed an SEM study of laser-induced surface modifications following ablation with a large variety of F and N. The obtained data are summarized in FIG. 19. One can see that the most favorable conditions for pure nanostructuring are ablation at low and medium values of laser fluence (F<1.5 J/cm²). FIG. 19 also shows the range of laser irradiation parameters where femtosecond laser ablation produces different combinations of surface nano-, micro-, and macro-structures.

Figure 20B:
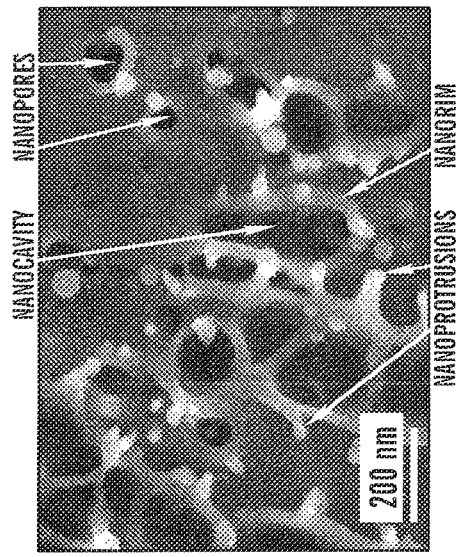
FIG. 20B shows an image of nascent nanostructures formed on copper by ablation at F=0.35 J/cm$^2$ with a single laser pulse using the laser described in the legend to FIG. 16, according to an illustrative embodiment of the invention.
Figure 20A:
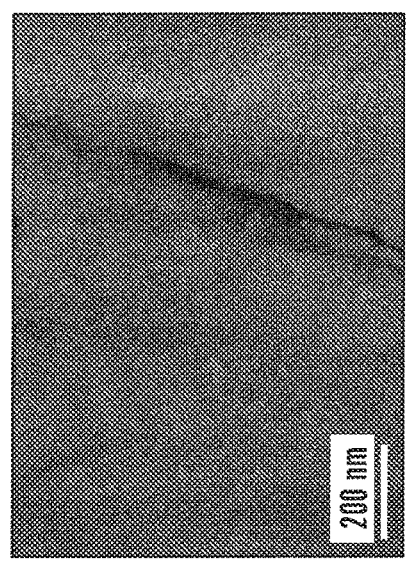
FIG. 20A shows an image of a copper sample surface before irradiation.

To determine the mechanism of nanostructuring, we performed a SEM study on the origin of nanoscale modifications. A representative example of nascent nanostructures following ablation with F=0.35 J/cm² and N=1 is shown in FIG. 20(b), where the characteristic types of initial nanostructures are labeled. For comparison, FIG. 20(a) shows an undamaged area of the sample using the same scale as in FIG. 20(b). It is seen in FIG. 20(b) that surface structuring is initiated on random, highly-localized nanoscale sites. The typical structures include circular nanopores with a diameter in the range of 40-100 nm, randomly-oriented nanoprotrusions with a diameter in the range of 20-70 nm and a length of 20-80 nm, nanocavities of arbitrary form, and nanorims around nanocavities. Under these femtosecond laser processing conditions, nanoscale features down to a size of 20 nm are produced. One can see from FIG. 20(b) that a nanopore or nanocavity is always immediately accompanied by a nanorim or nanoprotrusion, indicating a nanoscale material relocation to an adjacent site. These one-to-one nanoscale dips and protrusions occur randomly over the laser spot, suggesting an initial non-uniform laser energy deposition. Possible factors responsible for the spatial variation of the absorbed laser energy include: (1) the spatial inhomogeneity of the incident beam; (2) the enhancement of absorption by surface defects; (3) interference of the incident laser light with the excited surface electromagnetic waves due to structural defects. When the incident laser fluence is close to the laser ablation threshold, the spatial variations in deposited laser energy can produce a melt at localized nanoscale sites within the irradiated spot. Once the localized nanoscale melts have been formed, a high radial temperature gradient in a nanomelt can induce a radial surface tension gradient that expels the liquid to the periphery of the nanomelt. This will lead to the formation of nanocavities, nanoprotrusions, and nanorims due to fast freezing of the expelled liquid on the boundary with the solid state material (see FIG. 20(b)). This mechanism may also be used to explain the formation of nanobumps on a thin metal film. These initially induced surface random nanostructures can enhance the absorption of laser light and facilitate the further growth of surface nanoroughness due to the increased spatial nonuniform energy absorption. When laser fluence is sufficiently high to produce ablation, the atoms ejected from the nanomelts produce a recoil pressure that squirts liquid metal outside of the nanomelt. For multi-pulse ablation, the repeating vaporization and re-deposition of nanoparticles back onto the surface may also affect the surface nanostructuring. SEM morphology study at high fluence (F>5 J/cm²; i.e., strong ablation) shows that melt occurs over a large area of the ablated spot (see FIG. 18) and the flow dynamics in this large melt pool predominantly results in microstructuring. We have also studied the ambient gas pressure effect on nanostructuring by taking SEM images of platinum following single-pulse ablation in 1-atm air and in a vacuum at a base pressure of 8×10⁻³ Torr Although we have observed a greater amount of re-deposited nanoparticles in air than in vacuum, the morphology of nanostructures is still quite similar under different air pressures. Our study was performed with samples mounted vertically. It should be noted that the amount of re-deposited ablated particles back onto the sample surface may be different when the sample is positioned vertically versus horizontally, but further studies are required in this aspect of nanostructuring using fs laser pulses.

Example 4

Laser-induced periodic surface structures (LIPSS) on solids have been studied in a number of works in the past. Typically, LIPSS show regular groove structure with a period on the incident laser wavelength scale and oriented perpendicularly to the polarization of the incident light. LIPSS are commonly seen following long pulse irradiation on a variety of materials, including semiconductors, metals, and dielectrics.

In contrast to previous work performed mostly at relatively high fluence, we studied the formation of LIPSS on platinum and gold in a special fluence regime, namely, at near damage-threshold fluence. We found a unique type of LIPSS entirely covered with nanostructures. A distinctive feature of the nanostructure-covered LIPSS (NC-LIPSS) is that its period is appreciably less than that of the regular LIPSS whose period is approximately equal to the laser wavelength at normal incident laser light. The reduced period of the nanostructure-covered LIPSS is caused by a significant increase of the real part of the effective refractive index of the air-metal interface when nanostructures develop on a metal surface that affects the propagation of excited surface plasmon polaritons. Nanostructure-covered LIPSS has a variety of potential applications, such as modifying optical properties of materials and chemical catalysts where high surface-to-volume ratio is a crucial factor.

In this experiment, we used an amplified Ti: sapphire laser system that generates 65-fs laser pulses with energy about 1 mJ/pulse at a 1 kHz repetition rate and with a central wavelength $\lambda=0.8$ μm. The horizontally-polarized laser beam is focused onto a vertically standing metal sample in air at normal incidence. The number of laser shots, N, applied to the sample is selected with an electromechanical shutter. We studied the evolution of NC-LIPSS on metals following irradiation with N=1, 2, 4, 8, 10, 20, 30, 40, 50, 100, 200, 300, 400, 500 pulses at near damage-threshold fluence. The studied metals were platinum and gold. The laser fluence of the incident light was varied by changing the distance between the focusing lens and sample. To measure the laser pulse energy incident upon the sample, a fraction of the incident laser beam is split off by a beamsplitter and diverted to a pyroelectric joulemeter. The morphology of the produced periodic structures is examined using a scanning electron microscope (SEM). The surface profile is measured with an atomic force microscope (AFM). All sample surfaces were mechanically polished using 0.1 μm grade aluminum oxide powder.

Figure 21A:
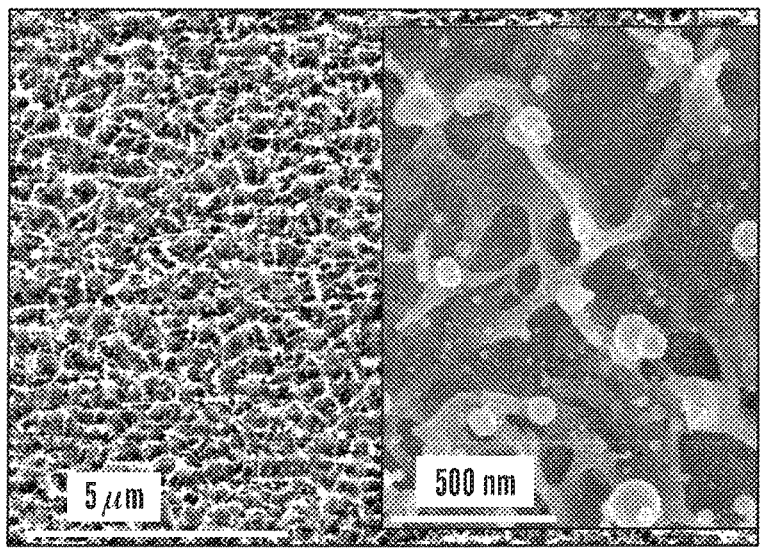
FIGS. 21A, 21B are SEM images showing the evolution of nanostructure-covered, laser induced periodic surface structures (NC-LIPSS) in the central area of the irradiated spot on a platinum (Pt) sample at F=0.16 J/cm$^2$ delivered from a Ti:sapphire laser system that generates 65 fs pulses with a central wavelength of 0.8 μm: (A) initial random nanoroughness formed after 10 shots (the inset shows a detailed view of the nanoroughness); (B) nanostructure-covered LIPSS after 30 shots (the inset shows a detailed view)
Figure 21B:
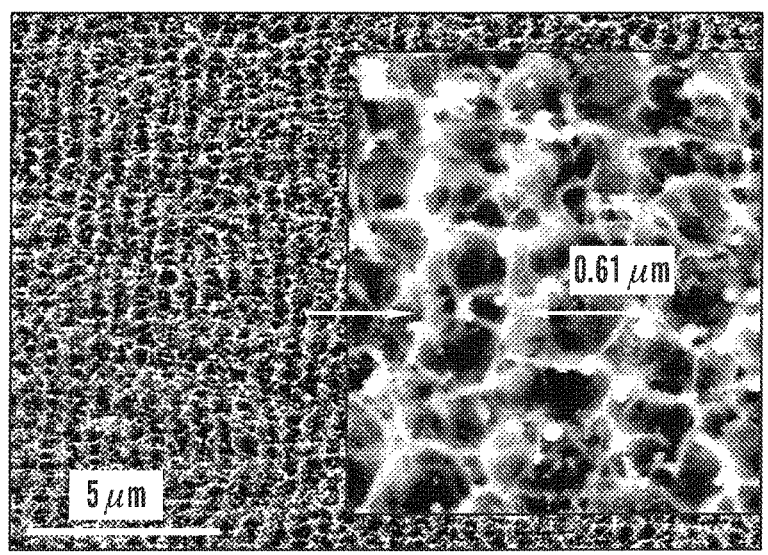
Figure 22A:
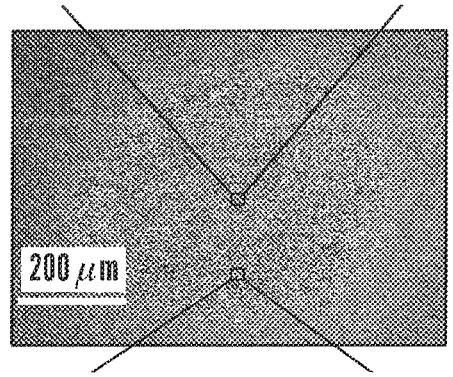
FIGS. 22(A-D) show SEM images illustrating the formation of NC-LIPSS in the peripheral area of the irradiated spot on Pt at F=0.16 J/cm² with 100 shots using the laser described in the legend to FIG. 21: (A) general view of ablated spot; (B) the magnified details show that LIPSS disappears in the central area; (C) nanostructure-covered LIPSS with a period of 0.62 μm in the peripheral area; (D) further magnified detail of (C), according to an illustrative embodiment of the invention.
Figure 22B:
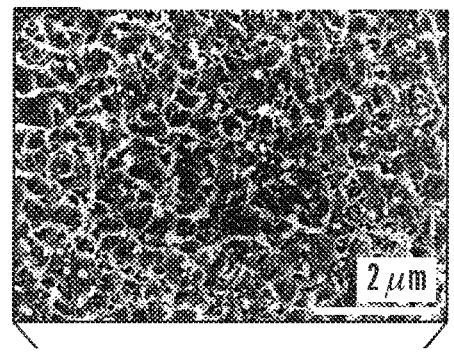
Figure 22C:
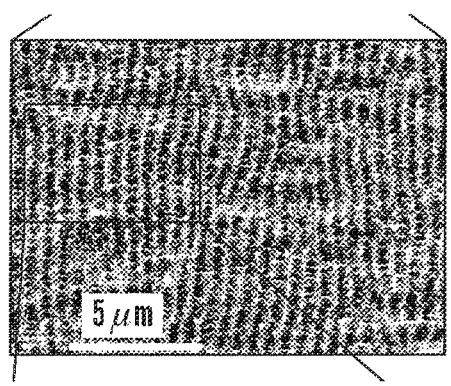
Figure 22D:
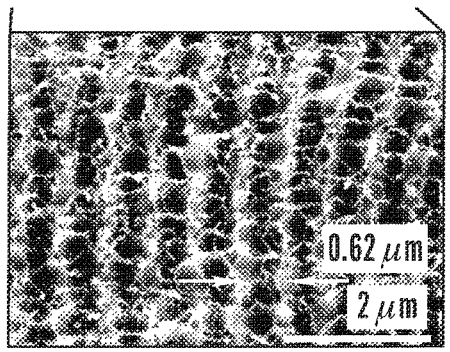
Figure 23:
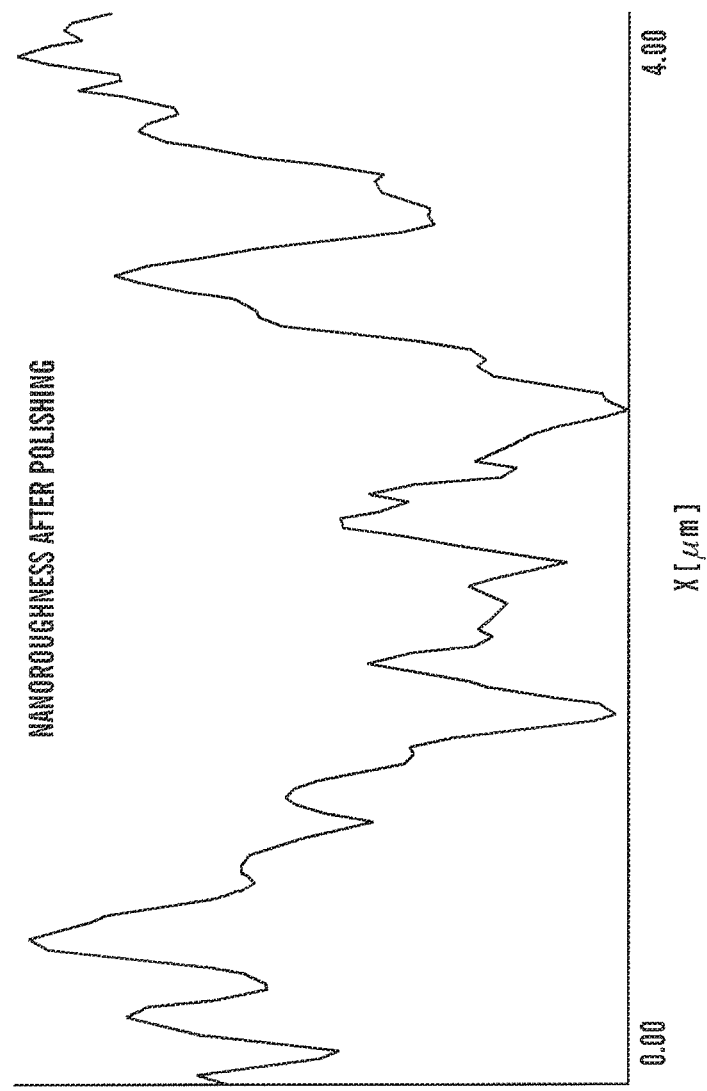
FIG. 23 is a graph showing Atomic Force Microscopy (AFM) measurements of the surface profile following mechanical polishing and 10 laser shots using the laser described in the legend to FIG. 21, according to an illustrative embodiment of the invention.
Figure 24:
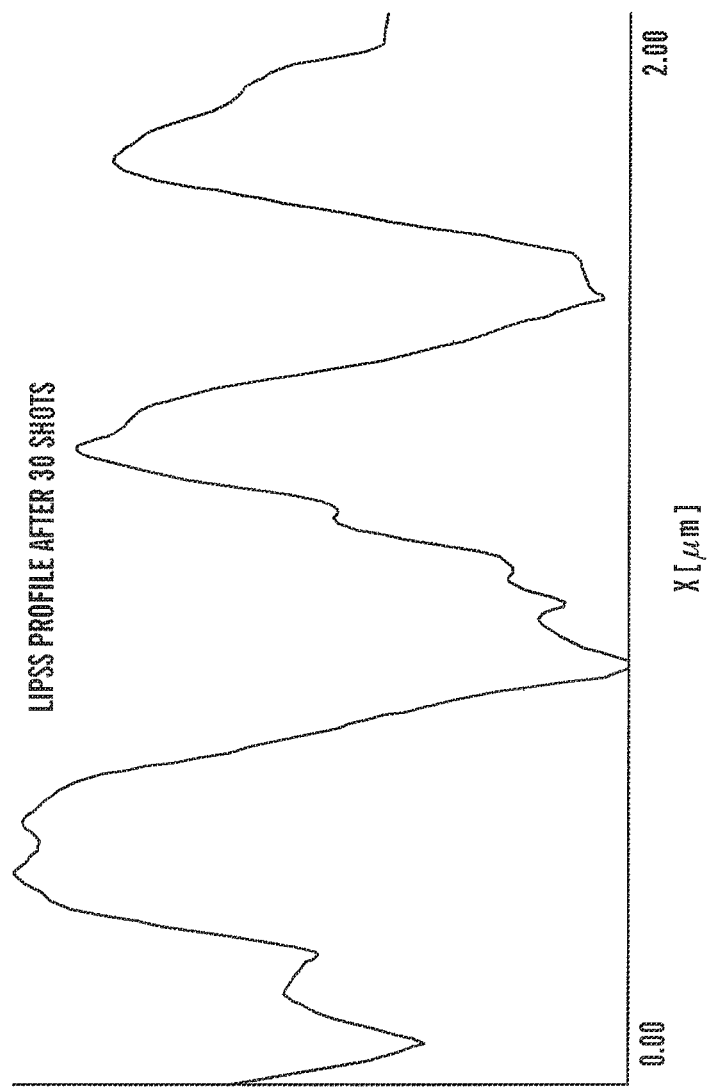
FIG. 24 is a graph showing a NC-LIPSS profile measured with AFM following 30 laser shots using the laser described in the legend to FIG. 21, according to an illustrative embodiment of the invention.
Figure 25:
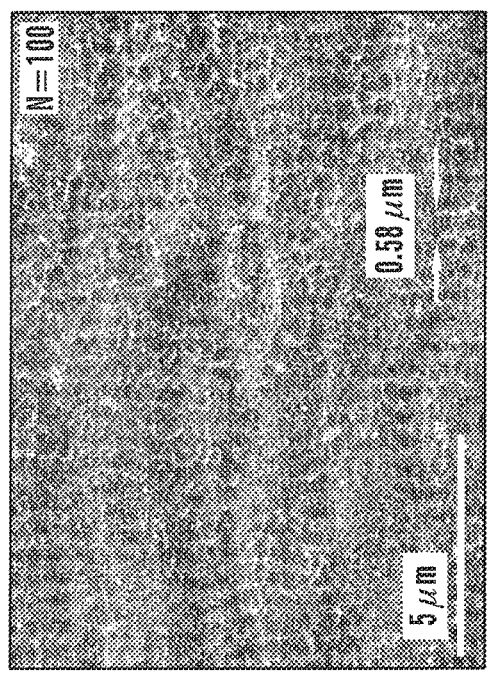
FIG. 25 is a SEM image showing nanostructure-covered LIPSS with a period of 0.58 μm in the central area of the irradiated spot on Au after 100 shots at a fluence of F=0.16 J/cm² using the laser described in the legend to FIG. 21, according to an illustrative embodiment of the invention.

The evolution of surface structures produced on Pt following ablation at near damage-threshold laser fluence of F=0.16 J/cm² is shown in FIGS. 21(a)-(b). FIG. 21(a) demonstrates surface random nanoroughness produced after 10 shot ablation. The inset in FIG. 21(a) shows that this initial surface modification is characterized by nanocavities and nanoprotrusions of various forms. At N=20, a microscale periodic pattern starts to form over the initially produced random nanoroughness. At this stage, only small patches of periodical structures are observed in various isolated locations within the irradiated spot, referred to below as intermediate LIPSS. With increasing N, the intermediate LIPSS grow and coalesce into a clear extended LIPSS with a period of 0.61 μm at N=30 (FIG. 21(b)). For N greater than 70 shots, LIPSS starts to disappear gradually in the central spot area (FIGS. 22(a) and 22(b)). However, clear NC-LIPSS continue to form in the peripheral area (FIGS. 22(c) and 22(d). Using AFM, the initial undamaged surface rms roughness is found to be about 5.6 nm after polishing, and a typical AFM surface profile measurement on Pt is shown in FIG. 23(a). Following ablation with N=1, 2, and 10 shots, surface rms roughness is found to be about 16.5, 35.2, and 79.8 nm, respectively. FIG. 23(b) shows typical surface roughness after N=10 shots. The surface profile of LIPSS after 30 laser shots is shown in FIG. 24. To gain the insight of how initial nanoroughness affects the formation of NC-LIPSS, we performed a SEM study of the formation of NC-LIPSS with samples of different initial surface conditions. We found that the extended LIPSS is produced with a smaller number of laser shots when the sample has a greater surface nanoroughness. To understand the material dependency in forming the nanostructure-covered LIPSS, we also performed a detailed SEM study of surface structural modifications on Au. Our data show that the general trend is similar for Au and Pt in forming the initial nanoroughness. The period of nanostructure-covered LIPSS on Au is observed to be 0.58 μm and is also markedly less than the laser wavelength (FIG. 25). However, the periodic patterns on Au are much less clear compared to Pt. Recently, we performed a comparison study on regular LIPSS on various metals following femtosecond laser radiation where LIPSS shows distinctly different level of morphological clearness among various metals even under identical experimental conditions. The electron-phonon energy coupling coefficient, g, is shown to directly correlate to the morphological clearness of LIPSS. A larger g coefficient usually leads to more pronounced LIPSS. In this study, g coefficient for Pt and Au are $25\times10^{16}$ and $2.1\times10^{16}$ W/m³K, respectively, and the much larger g coefficient explains why LIPSS is much more clear on Pt than Au.

The periodic patterns induced by femtosecond laser processing are distinctly different from those produced by longer pulses in two aspects. First, femtosecond laser-induced periodic structures are covered by random nanostructures. Secondly, the LIPSS period induced by femtosecond pulses at normal incidence is appreciably less than the laser wavelength while the period is roughly equal to the wavelength for longer pulses. To account for our observation, we carefully examined the evolution of surface structural modifications on both Pt and Au, and we propose the following mechanism for the formation of NC-LIPSS. The first few laser shots usually produce sparsely and randomly distributed nanostructures. It is known that surface plasmons, both localized and propagating along a surface, can be excited by coupling laser energy into nanostructures. With further increase of the number of laser shots, more nanostructures appear allowing excitation of more localized and propagating surface plasmons. The produced nanoroughness includes nanorods, nanocones, and nanospheres, and these nanostructures will excite propagating cylindrical surface plasmons that subsequently interfere with the incident light. This interference causes the formation of intermediate periodic surface microstructures. As the number of laser shots increases, the intermediate microstructures will grow as well as the area occupied by these structures. The developed intermediate periodic surface microstructures will further excite propagating plane surface plasmons that interfere with the plane incident laser light wave, and this interference will finally result in the permanent extended periodic microstructures.

Figure 5A:
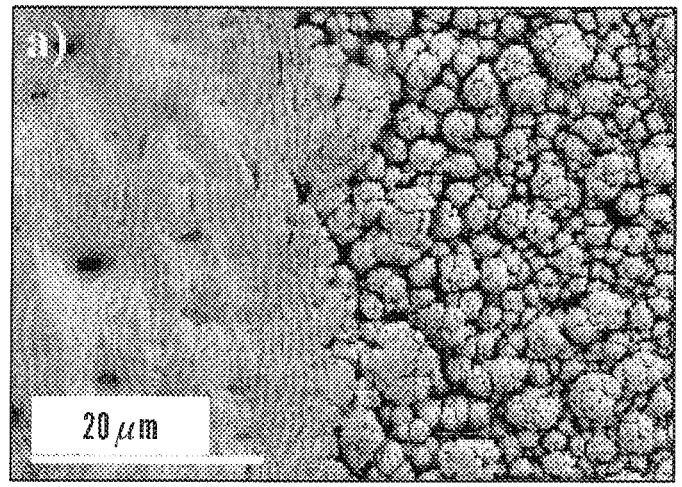
FIGS. 5A, 5B are SEM images showing (a) NC-LIPSS on the periphery of the irradiated area and gold-black deposit outside the irradiated area after 10,000 shots at a fluence of F=1.1 J/cm$^2$ (region DE in FIG. 1) from the laser described in the legend to FIG. 1; (b) gold-black deposit after 20,000 shots at F=0.17 J/cm$^2$ (region CD in FIG. 1) consisting of spherical aggregates with a mean diameter that decreases as the distance from the crater increases, according to an illustrative embodiment of the invention.
Figure 5B:
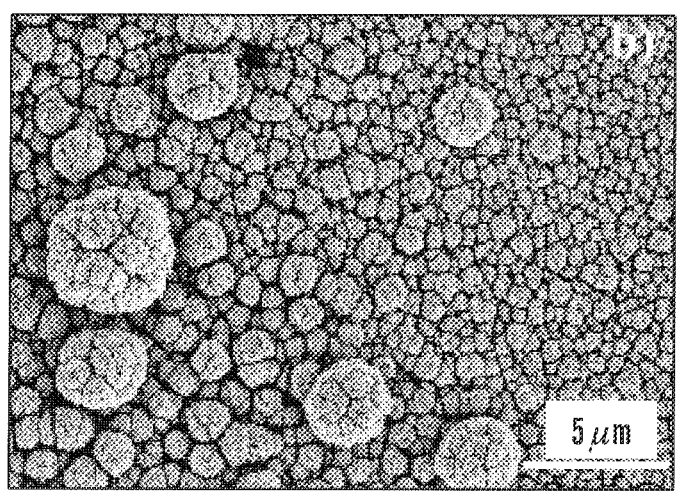

For normally incident linearly polarized light, the period d of the surface grating formed due to the interference between the incident laser light and the excited surface plasmon wave is given by equation 1 as:

$$d=\lambda/\eta \tag{1}$$

with g∥E, where $\lambda$ is the incident light wavelength, $\eta=\text{Re}[\varepsilon/(\varepsilon+1)]^{1/2}$ is the real part of the effective refractive index of the air-metal interface for surface plasmons, $\varepsilon$ is the dielectric constant of the metal, g is the grating vector, and E is the electrical field vector of the incident wave. For a plane vacuum-metal interface, η is calculated to be 1.0096 at λ=800 nm for Pt ($\varepsilon_1$=−15.5 and $\varepsilon_2$=23.5) and 1.022 for Au ($\varepsilon_1$=−23.4, $\varepsilon_2$=1.55). Using Eq. (1), the grating period is found to be 0.79 μm for Pt and 0.78 μm for Au. However, the observed period is 0.61 μm for Pt (FIG. 1 (b)) and 0.58 μm for Au (FIG. 5). If we substitute these values of the observed period into Eq. (1), we will have η=1.31 for Pt and η=1.38 for Au. To explain this discrepancy, we note that the table values of $\varepsilon_1$ and $\varepsilon_2$ for Pt and Au are obtained from smooth surface and at room temperature, and therefore these values may not be suitable when the metals are heated by high-intensity femtosecond pulses and covered with nano- and micro-structures. To better understand the high-intensity effects on NC-LIPSS period, we performed a detailed study of LIPSS in various locations within the damaged spots on metals. From these data summarized in Table 1, we can see that the NC-LIPSS period remains the same in the central and peripheral areas of an irradiated spot despite the fact that the two locations have different intensities due to the Gaussian beam profile. On the other hand, the period of our NC-LIPSS decreases with increasing N when the surface roughness grows while the light intensity remains constant. Furthermore, the NC-LIPSS produced using a higher fluence of 0.16 J/cm² exhibit a similar period as that produced at F=0.084 J/cm². Our observations indicate that the high-intensity effect on dielectric constant is not essential, whereas the effects of surface morphology (nano- and micro-roughness) are more dominant. It is known that surface roughness causes an increase in the modulus of the surface plasmon wave vector, and this will correspond to an increase in the real part of the refractive index. According to Eq. (1), an increased real part of the refractive index for propagating surface plasmons will cause a reduced NC-LIPSS period, which agrees with our experimental observation.

TABLE 1

Nanostructure-covered LIPSS period in different areas of the irradiated spot on platinum at F = 0.084 J/cm².

| Number of shots | LIPSS period (μm) | |
|---|---|---|
| | Central area | Peripheral area |
| 30 | 0.62 | 0.61 |
| 50 | 0.58 | 0.61 |
| 100 | 0.57 | 0.57 |
| 200 | 0.55 | 0.54 |
| 500 | 0.55 | 0.53 |

Under certain conditions we also produced a large number of nanoprotrusions and nanocavities on a metal surface (see FIG. 22). The nanostructures produced can greatly increase the effective surface area, which may be of importance in many technological applications, such as but not limited to producing better chemical catalysts where a high surface-to-volume ratio is a crucial factor.

Example 5

In this study we performed a femtosecond laser surface treatment of titanium to help determine the potential of this technology for surface structuring of titanium implants. We found find that femtosecond laser processing produces a large variety of nanostructures (nanopores, nanoprotrusions) with a size down to 20 nm, multiple parallel grooved surface patterns with a period on the sub-micron level, microroughness in the range of 1-15 μm with various configurations, smooth surface with smooth micro-inhomogeneities, and smooth surface with sphere-like nanostructures down to 10 nm. Also, we have determined the optimal conditions for producing these surface structural modifications. Femtosecond laser treatment may produce a richer variety of surface structures on titanium for implants and other biomedical applications than long-pulse laser treatments.

Due to good biostability, biocompatibility, mechanical performance, and long-term durability, titanium has been widely used in a variety of biomedical applications such as dental and orthopedic implants, and implantable electronic devices. In numerous in vitro and in vivo studies, surface topography of titanium implants has been shown to be important in enhancing implant performance. It has been shown that both microstructures and nanostructures influence biological processes at implant interfaces. Various methods of implant surface structuring have been studied in the past such as grit-blasting, chemical etching, laser treatment, and the combinations of the various methods. Recent studies have shown that laser processing of implant surfaces provides both suitable surface topography and less surface contamination as compared with other methods. Another advantage of laser processing is that the technique is also suitable for texturing of implants of more complicated shapes. In the past, surface structures have been produced using long-pulse lasers, including nanosecond Nd:YAG laser, copper vapor laser, nanosecond excimer lasers, picosecond Nd:YAG laser, and sub-picosecond excimer laser. Femtosecond lasers have advantages over nanosecond lasers in aspects of higher precision, reduced heat-affected zone, and smaller amount of debris around the ablated spot.

The effects of laser fluence and the number of applied pulses on laser-induced surface topography in titanium are reported herein. We found that a femtosecond laser produces a large variety of nanostructures (nanopores, nanoprotrusions) with a size down to 20 nm, multiple parallel grooved surface patterns with a period on the sub-micron level, microroughness in the range of 1-15 μm with various configurations, smooth surface with smooth micro-inhomogeneities, and smooth surface with sphere-like nanostructures down to 10 nm. Our results suggest that femtosecond laser treatment can produce a richer variety of surface structures on titanium for implants and other biomedical applications than long-pulse laser treatments.

Commercially pure titanium flat plates with a dimension of 15×17×1.5 mm were used in our experiment. The plates were mechanically polished using 0.1-μm-grade aluminum oxide powder and further cleaned with acetone. For surface texturing, we used an amplified Ti:sapphire laser system that generates 65-fs laser pulses with the pulse energy over 1 mJ at a 1 kHz repetition rate with a central wavelength of 0.8 μm. The laser beam is horizontally polarized and was focused at normal incidence onto a vertically standing titanium sample in air at a pressure of 1 atm. For laser beam focusing, we used an achromatic lens with a focal length of 20 cm. The laser fluence of the incident light was varied by changing the distance between the focusing lens and the sample. The diameter of laser-irradiated spots on the titanium sample was varied from 100 to 1200 μm. The number of laser shots, N, applied to the sample was selected with an electromechanical shutter. The surface structuring of titanium was studied following the treatment with laser fluence of F=0.067, 0.084, 0.16, 0.35, 0.48, and 2.9 J/cm² and the number of applied pulses, N, in the range of 1-30,000. Following femtosecond laser treatment, the topography of surface modifications was studied using a SEM.

Figure 26B:
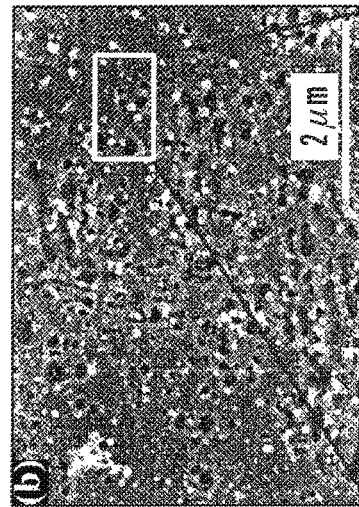
FIGS. 26(A-D) are SEM images of nanoroughness on a titanium (Ti) sample following fs laser treatment at near damage threshold fluence of F=0.067 J/cm² using a Ti:sapphire laser system that generates 65 fs pulses with a central wavelength of 0.8 μm: (A) sample surface before irradiation; (B) nanoroughness after two shot laser treatment; (C) after 10 shot treatment; (D) a magnified view of a section in (B) showing fine surface nanostructures in the forms of nanopores and nanoprotrusions typically of spherical shape, according to an illustrative embodiment of the invention.
Figure 26D:
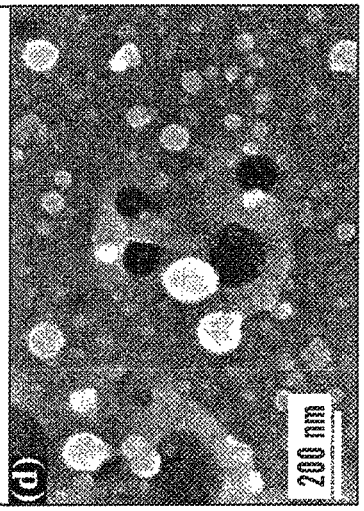
Figure 26A:
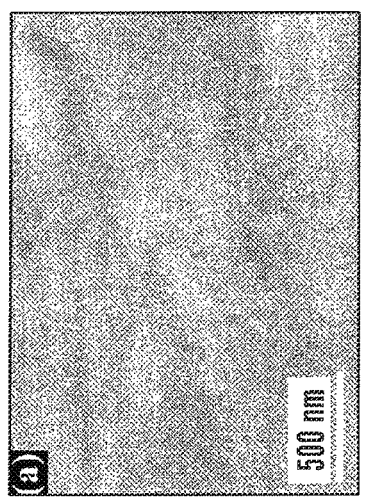
Figure 26C:
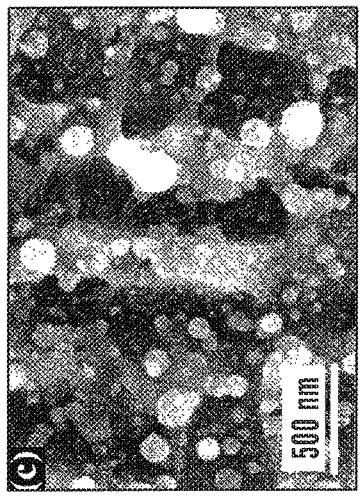
Figure 27B:
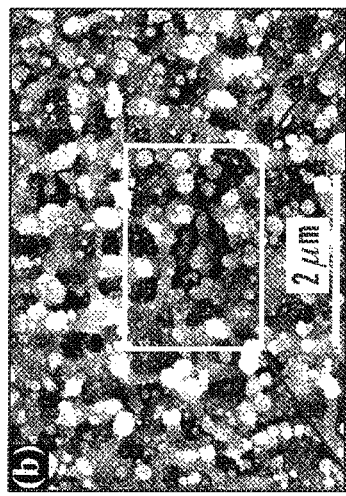
FIGS. 27(A-D) show SEM images illustrating the nanotopography of Ti following femtosecond laser treatment at F=0.084 J/cm² using the laser described in the legend to FIG. 26: (A) nanoroughness after one shot; (B) nanoroughness after two shots; (C) a magnified view of a section in (A) showing fine details of surface nanoroughness; (D) magnified view of a section in (B) showing fine details of surface nanoroughness.
Figure 27D:
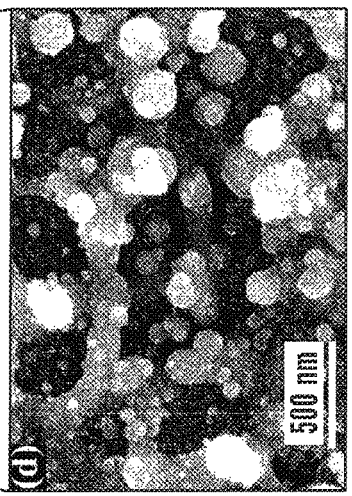
Figure 27A:
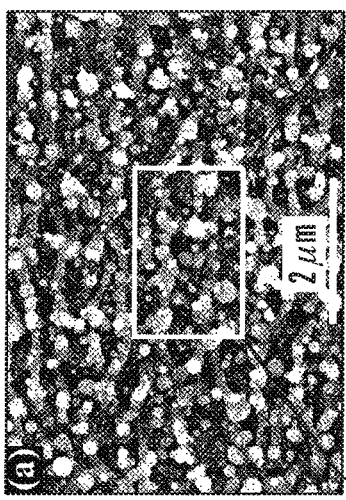
Figure 27C:
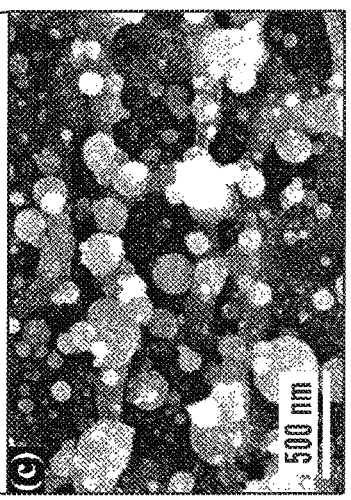
Figure 28A:
FIGS. 28(A-D) show SEM images illustrating fs laser produced periodic surface patterns on Ti following laser treatment at F=0.067 J/cm² using the laser described in the legend to FIG. 26: (A) periodic surface pattern after 40 shots; (B) periodic surface pattern after 100 shots; (C) periodic surface pattern after 400 shots; (D) a magnified view of a section in (C) showing fine details of the periodic pattern covered with nanostructural features, according to an illustrative embodiment of the invention.
Figure 28B:
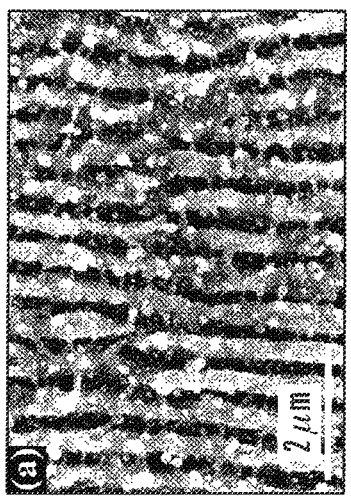
Figure 28C:
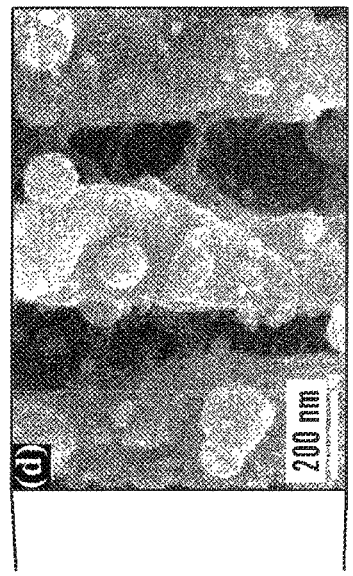
Figure 28D:
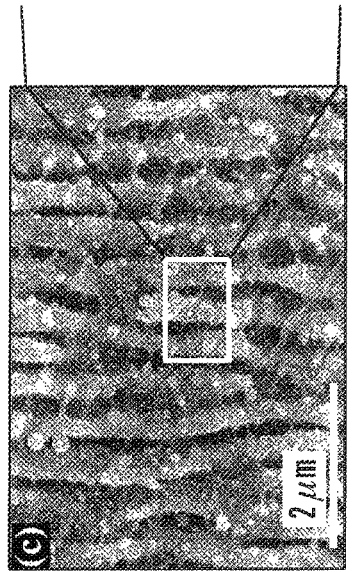
Figure 29B:
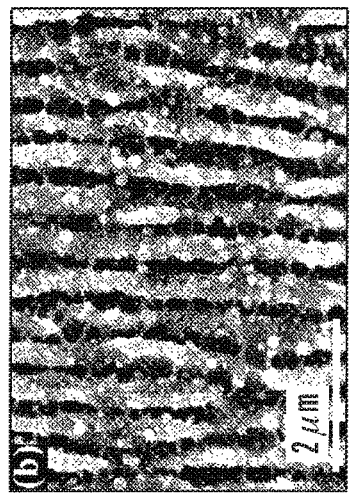
FIGS. 29(A-D) show SEM images illustrating fs laser produced periodic surface patterns on Ti following laser treatment at F=0.084 J/cm² using the laser described in the legend to FIG. 26: (A) periodic surface pattern after 20 shots; (B) periodic surface pattern after 400 shots; (C) periodic surface pattern after 800 shots; (D) a magnified view of a section in (C) showing fine details of the periodic pattern covered with nanostructural features, according to an illustrative embodiment of the invention.
Figure 29D:
Figure 29A:
Figure 29C:
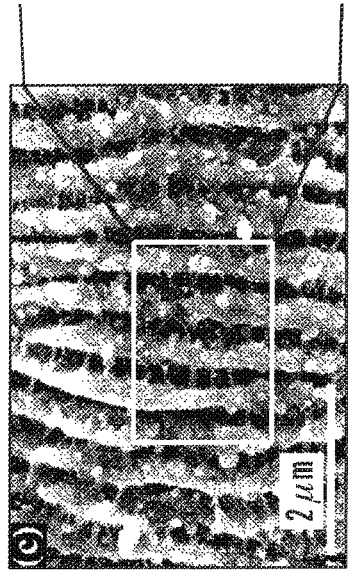
Figure 30B:
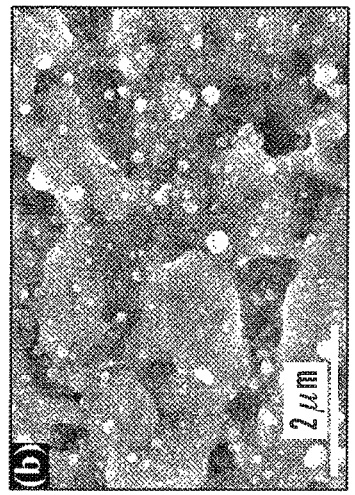
FIGS. 30(A-D) show SEM images illustrating the surface nano- and microtopography of Ti following fs laser treatment at F=0.16 J/cm² using the laser described in the legend to FIG. 26: (a) nanoroughness after one shot; (b) nano- and microroughness after 20 shots; (c) typical microroughness covered with nanostructures after 40 shot treatment; (d) typical columnar microstructure after 200 shot treatment, according to an illustrative embodiment of the invention.
Figure 30D:
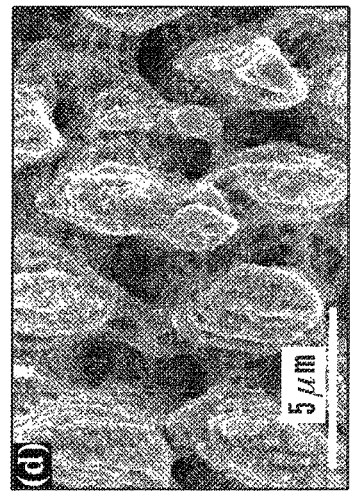
Figure 30A:
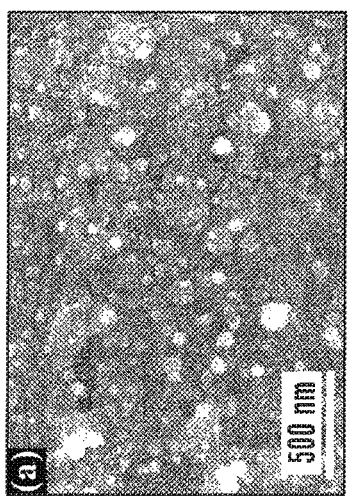
Figure 30C:
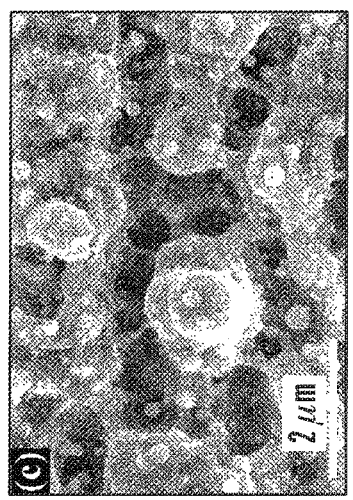
Figure 31B:
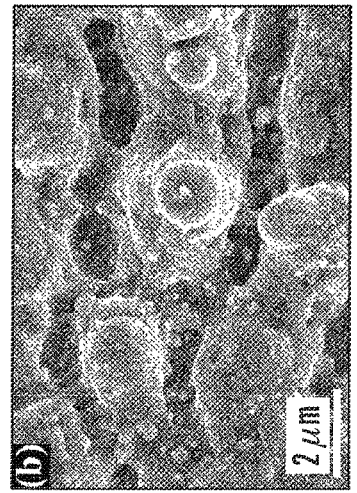
FIGS. 31(A-D) show SEM images illustrating the surface topography of Ti following fs laser treatment at F=0.35 J/cm² using the laser described in the legend to FIG. 26: (a) nano and microroughness after one shot laser treatment; (b) typical random microroughness covered with nanostructures after 40 shot treatment; (c) typical columnar microstructures after 100 shot treatment; (d) typical columnar microstructures after 200 shot treatment, according to an illustrative embodiment of the invention.
Figure 31D:
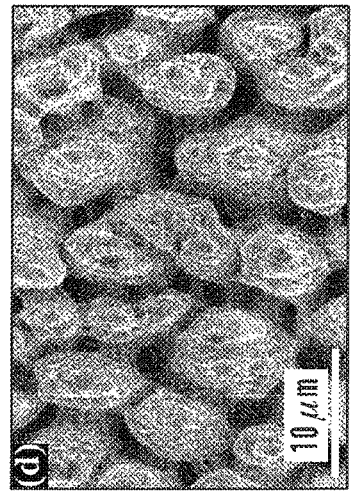
Figure 31A:
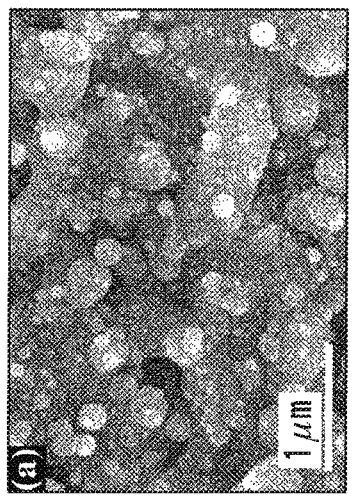
Figure 31C:
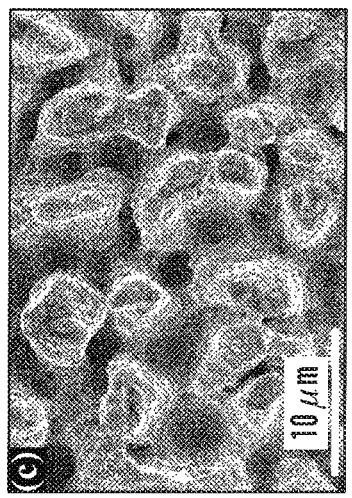

As a reference, FIG. 26(a) shows a SEM image of the titanium surface prior to laser irradiation. FIGS. 26(b)

through 26(*d*) demonstrate surface topography produced by femtosecond laser processing at near-damage-threshold fluence of F=0.067 J/cm$^2$ for different numbers of laser shots, where the characteristic features are random nanopores and sphere-like nanoprotrusions with the size down to about 15-20 nm. Laser-induced surface nano-topography depends on both the number of applied pulses and laser fluence. At higher fluence of F=0.084 J/cm$^2$, the nanoroughness produced is shown in FIGS. 27(*a*) through 27(*d*), where the average size of the nanostructures at this higher fluence is larger than those at lower fluence in FIG. 1. For N>10-15, periodic ordering of surface nanoroughness begins to occur. FIGS. 28 and 29 show some typical periodic patterns for laser fluences F=0.067 and 0.084 J/cm$^2$, respectively. The period of the grooves is about 0.53 μm. These periodic patterns with sub-micron periods are covered with nanoroughness, as shown in detail in FIGS. 28(*d*) and 29(*d*). With increasing laser fluence, the periodic patterns are less likely produced and microroughness becomes a more dominant surface structure. FIG. 30 shows surface topography produced following treatment at F=0.16 J/cm$^2$ at various N. At this middle-level laser fluence, pure nanoroughness is observed only after one-shot laser processing (FIG. 30(*a*)). A clear microscale roughness covered with nanoroughness develops after 20-shot treatment (FIG. 30(*b*)). With further increasing N, microroughness continues to develop with deepening of cavities (FIG. 30(*c*)). At a large enough N, columnar surface micro-structures covered with nanoroughness are seen in FIG. 30(*d*). At higher laser fluence of F=0.35 J/cm$^2$, a combination of nano- and micro-structures is produced after only one laser shot, as shown in FIG. 31(*a*). With increasing N, columnar microstructures rapidly develop as the dominating structures (see FIGS. 31(*b*)-31(*d*)). When the laser fluence is increased to the level of F=0.48 J/cm$^2$, a different type of surface microstructures is observed, as shown in FIGS. 32(*a*)-32(*c*). At this laser fluence and for N>1000, a pore of the size of the focused laser beam can be created. An example of such a pore with the diameter of 350 μm is shown in FIG. 32(*d*), where microstructures are also seen at bottom of the pore. At the highest fluence used in our experiment, F=2.9 J/cm$^2$, one laser shot can produce surface melting over the entire irradiated surface area, and resolidification of this surface melt results in a smooth surface covered with some micro-inhomogeneities as shown in FIG. 33(*a*). Following two-pulse irradiation, an even smoother surface is seen in FIG. 33(*b*). A magnified picture showing nanoscale features of such smooth surfaces is shown in FIG. 33(*c*). A detail picture of the titanium surface after four laser shots is shown in FIG. 33(*d*), where one can see nanoscale structures as small as down to 10 nm. The smooth surface is produced with a low number of laser shots (N<10). At a larger N (N>10), micro-inhomogeneities develop rapidly and eventually a crater of the size of the focused laser beam will be formed.

It has been shown that implant surface topography is an important factor affecting the behaviors of both proteins and cells on implant surfaces. It is generally accepted that proteins typically respond to surface structural features (pits, pillars, steps) about 1-10 nm, while cells can be sensitive to structural features on the scale of 15 nm-100 μm. It was also found that structured implants have a better mechanical interlocking of the bone-implant interfaces than smooth implant surfaces due to an increased surface area. Also, it has been reported that extended parallel groove structures may cause cells to align and migrate along the grooves, a contact guidance phenomenon. Our SEM study shows that all of these types of surface textures can be produced by femtosecond laser treatment.

Little work has been done on laser fabrication of surface nanostructures on titanium. Our study shows that femtosecond laser technique can produce a large variety of both pure nanostructures (FIGS. 26(*b*)-26(*d*), 27(*a*)-27(*d*), and 33(*c*)) and various combinations of micro- and nanostructures (FIGS. 28(*d*), 29(*d*), 30, 31). There are two types of pure nanostructures observed in our experiment. The first type (FIGS. 26(*b*)-26(*d*), 27(*a*)-27(*d*)) is produced at low laser fluence (near the damage threshold) and a low number of laser shots; the size of these nanostructures is down to 20 nm. The second type (FIGS. 33(*c*) and 33(*d*)) is produced at high fluence and low N when laser irradiation causes the surface to melt uniformly over the entire irradiated area; the size of these nanostructures is down to 10 nm.

Examination of shot-to-shot SEM images of surface topography suggests the following mechanism for the formation of nanostructures of the first type. It is seen from FIG. 26(*d*) that a nanopore is always accompanied by a nearby nanoprotrusion, indicating a nanoscale material relocation to an adjacent site. This one-to-one nanoscale pores/protrusions relationship occurs randomly over the laser spot, suggesting an initial non-uniform laser energy deposition. When the incident laser fluence is close to the laser damage threshold, spatial nonuniformity in the deposited laser energy can produce a melt at localized nanoscale sites within the irradiated spot. Once the localized nanoscale melt has been formed, a high radial temperature gradient in a nanomelt can induce a radial surface tension gradient that expels the liquid to the periphery of the nanomelt. This can lead to the formation of nanocavities and nanoprotrusions due to fast freezing of the expelled liquid on the boundary with the solid state material. These initially induced surface random nanostructures enhance the absorption of laser light and facilitate further growth of surface nanoroughness with increasing number of laser shots due to the increased spatial non-uniform energy absorption. When laser fluence is sufficiently high to produce ablation, particles will be ejected from the nanomelts and produce a recoil pressure that squirts the liquid metal outside of the nanomelt. It should be noted that for multi-pulse ablation, the repeating vaporization and re-deposition of nanoparticles back onto the surface can also promote surface nanostructuring. As seen from FIGS. 26 and 27, the average size and density of femtosecond laser-induced nanostructural features can be controlled by varying both the laser fluence and number of laser shots.

Mechanisms for the formation of nanostructures of the second type cannot be straightforwardly derived from our SEM study. The formation of these nanostructural features may be due to redeposition of ablated nanoparticles back onto the irradiated surface.

Multiple parallel grooved surface patterns for biomedical applications are commonly produced using lithographic or laser holographic techniques. However, fabrication of these type of patterns on biomaterials using a single laser beam has not been reported. Below we discuss the optimal conditions for producing these structures and explain the physical mechanisms of their formation.

Our study shows that optimal conditions for producing periodic groove patterns on titanium are at near-damage-threshold fluence and with the laser shot number in the range between 20 and 800. In the past, multiple parallel grooved surface patterns have been produced by long-pulse lasers and are known as laser-induced periodic surface structures (LIPSS). The formation of LIPSS on metals is believed to result from the interference of the incident laser light with the excited surface plasmon polaritons that result in spatial periodic energy distribution on the surface. Usually, LIPSS shows a regular groove structure with a period on the incident laser wavelength scale and is oriented perpendicularly to the polarization of the incident light. Our results of the evolution of surface structural modifications on titanium suggest the following mechanism for the formation of the observed LIPSS. In our experiment, the first few laser shots produce sparsely and randomly distributed nanostructures. It is known that propagating cylindrical surface plasmons can be excited by coupling laser energy into nanoroughness, and this can give rise to their interference with the incident light. This interference will, first, cause the formation of intermediate periodic surface structures in localized areas of the irradiated spot. An example of such intermediate periodic surface structure can be seen in FIG. 26(c). With further increasing number of laser shots, the number of intermediate periodic structures will grow as well as the area occupied by these structures. The developed intermediate periodic surface structures will further excite propagating plane surface plasmons and their interference with the plane incident laser light wave will, finally, result in the permanent extended periodic grating.

For linearly polarized incident laser light, the period d of the surface grating formed due to the interference between the incident laser light wave and the excited surface plasmon wave is given by $d=\lambda/(\eta \pm \sin\theta)$ with $g \| E$, where in this equation $\lambda$ is the incident light wavelength, $\eta = \text{Re}[\varepsilon/(\varepsilon+1)]^{1/2}$ is the real part of the effective refractive index of the air-metal interface for surface plasmons, $\varepsilon$ is the dielectric constant of the metal, $\theta$ is the laser light incidence angle, g is the grating vector, and E is the electrical field vector of the incident wave. The above equation shows that the period of laser-fabricated grating can be varied by changing the laser wavelength, the incidence angle, or the real part of the effective refractive index. An important parameter affecting the cell behavior is known to be groove depth, and this parameter in fabricating LIPSS can be controlled by the number of applied laser shots.

A unique feature of the periodic groove structures produced according to the embodiments herein is that both ridges and grooves are covered with nanoroughness following femtosecond laser treatment, in contrast to rectangular surface grooves fabricated using lithography techniques that usually have smooth ridges and rough floors.

Laser microtexturing of titanium has been studied in the past using long-pulse lasers. It has been shown that laser processing of implant surfaces provides both suitable surface microstructures and the least surface contamination as compared with other methods. As shown in FIGS. 30(b)-30(d), 31(a)-31(d), 32(a)-32(c), and 33(a), a rich variety of microstructures can be produced by femtosecond laser treatment, and these structures can be characterized as the following two types. The first type (see FIGS. 30(b)-30(d), 31(a)-31(d), 32(a)-32(c)) is produced at the middle levels of the laser fluence (F=0.16 and 0.35 J/cm²). The characteristic size of this type of microroughness is in the range of 1-15 μm. Both the characteristic size and configuration of the surface microroughness can be controlled by both laser fluence and the number of applied shots. This type of microroughness seems to be only produced by femtosecond laser treatment. The second type of microroughness (see FIG. 33(a)) is characterized by a smooth surface with smooth micro-inhomogeneities. This type of microroughness is produced at the highest laser fluence in our experiment (F=2.9 J/cm²) when melting occurs over the entire irradiated area. If the melted surface has some structural inhomogeneities, fast resolidification of this melted surface may result in smooth micro-scale roughness.

Figure 33A:
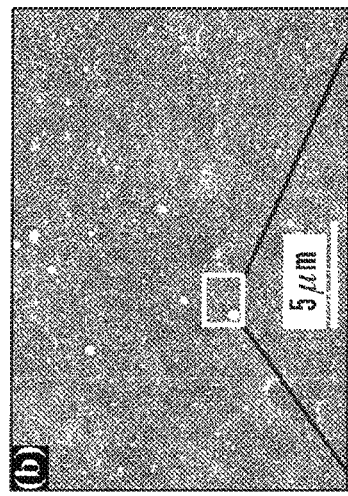
FIGS. 33(A-D) show SEM images illustrating the surface topography of Ti following fs laser treatment at F=2.9 J/cm² using the laser described in the legend to FIG. 26: (a) smooth surface with microinhomogeneities after a one shot laser treatment; (b) smooth surface with some nanostructures after two shots; (c) a magnified view of a section in (b) showing surface nanostructures; (d) nanotopography of a smooth surface following 4 shot treatment with observable spherical nanostructures as small as about 10 nm, according to an illustrative embodiment of the invention.
Figure 33B:
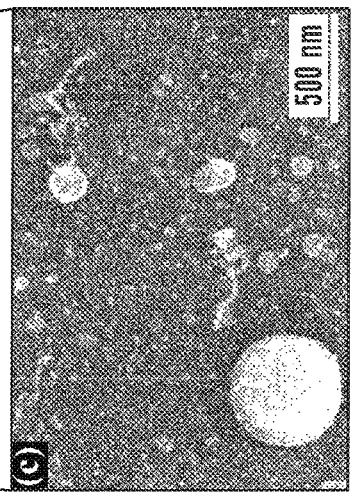
Figure 33C:
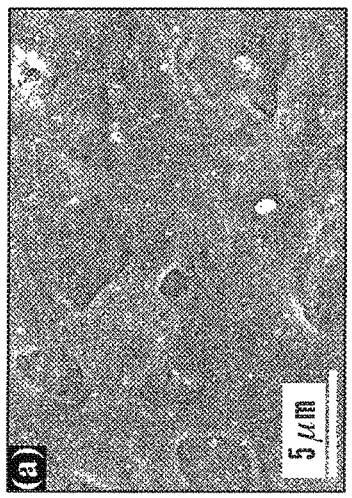
Figure 33D:
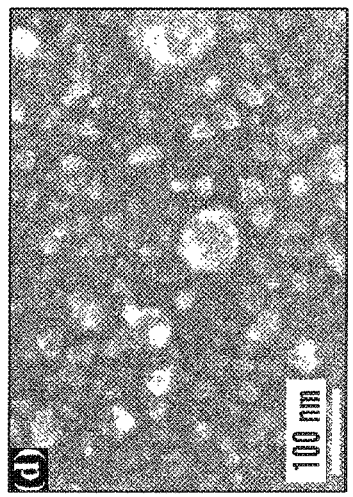

Some parts of implant surfaces may be required to be smooth. Previously, nanosecond excimer lasers have been used for polishing machined titanium implants, and effects of both polishing and cleaning of the surfaces have been reported). Our study shows that smoothed surface can be also obtained with femtosecond laser treatment, as shown in FIG. 33(b).

Figure 32A:
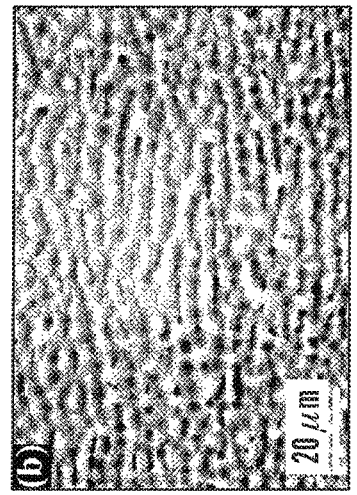
FIGS. 32(A-D) show SEM images illustrating the surface topography of Ti following fs laser treatment at F=0.48 J/cm² using the laser described in the legend to FIG. 26: (a) microroughness covered with nanoroughness after 40 shots; (b) typical microstructures following 70 shot treatment; (c) typical microstructures following 100 shot treatment; (d) a crater with a diameter of about 350 μm after a 1,500 shot treatment, according to an illustrative embodiment of the invention.
Figure 32B:
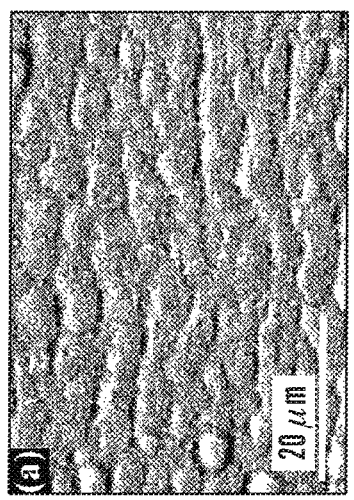
Figure 32C:
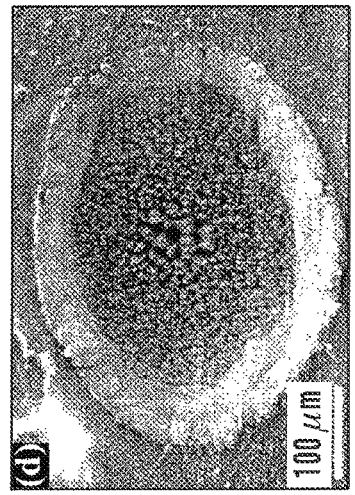
Figure 32D:
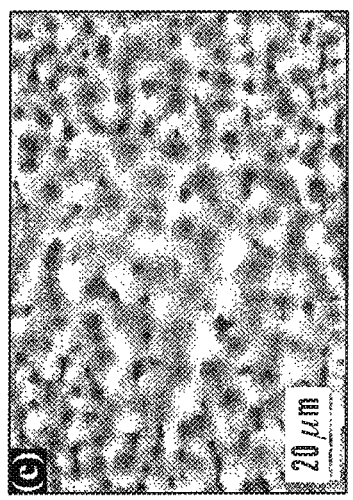

It is known that open pores with a diameter in the range of 100-400 μm can improve the strength of bone-implant interfaces. Recently, long-pulse lasers have been used for fabricating 100-300 μm pores on Ti6Al4V implants. Our study shows that pores of this size can be produced with femtosecond laser treatment, as shown in FIG. 32(d). We note that we can further produce various surface structures on the pore bottom through femtosecond laser treatment.

Example 6

Another application of femtosecond laser surface structuring to produce the materials processing of the presently embodied invention is to provide the controllable modification of the optical properties of metals, where these optical properties range from the UV to THz spectral range, and where the modifications may be used to create various black, grayed, and colored metals.

Figure 34:
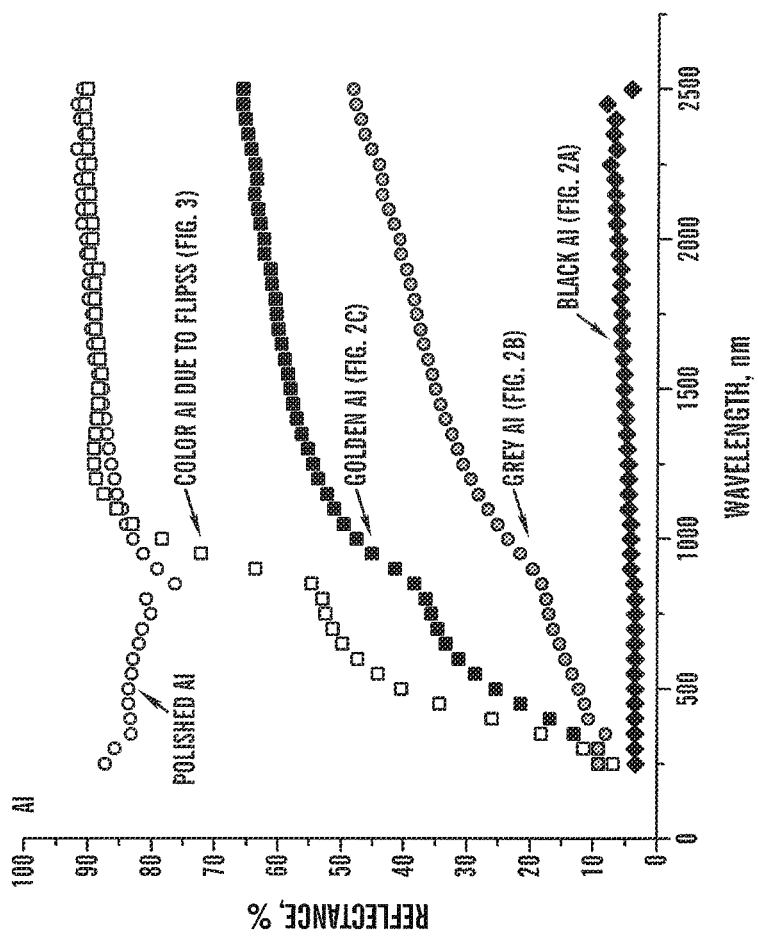
FIG. 34 shows a plot of % reflectance versus wavelength in nm for polished Al (open circles); "black" Al (black diamonds; see also FIG. 35(A)); grayed Al (gray circles; see also FIG. 35(B)); "golden" Al (gray squares; see also FIG. 35(C)); and, Al colored by NC-LIPSS (open squares; see also FIG. 36), according to an illustrative embodiment of the invention.
Figure 35A:
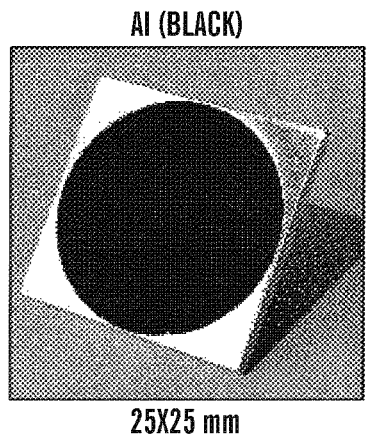
FIGS. 35(A-C) show photographs of metals processed to have different optical properties: (A) black Al; (B) grayed Al with two gray shades; (C) golden Al, according to an illustrative embodiment of the invention.

As an example, FIG. 34 shows the % reflectance from 0.25 to 2.5 μm of "black" aluminum obtained by the materials processing methods of the present invention. In the visible this aluminum appears pitch black as illustrated in FIG. 35(a).

Figure 35B:
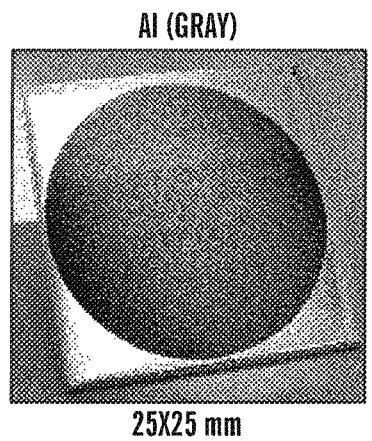

By varying the materials processing parameters, we have also produced aluminum that appears to be various shades of gray. Thus in the case of the grayed aluminum as shown in FIG. 35(b), the materials processing was performed at laser fluence F=7.9 J/cm², a scanning speed of the laser beam across the surface of the Al of v=1 mm/s, and translation between scanning lines S=100 μm. The two gray shades of aluminum shown in FIG. 35(b) are obtained by varying the laser pulse repetition rate (f=100 Hz for the darker shade and 93 Hz for the lighter one). The spectral reflectance of this darker gray aluminum sample is shown in FIG. 34.

In addition to producing various shades of gray as discussed above, the materials processing methods of the present invention can also produce colored metals; i.e., metals that appear to have a particular color or that appear to have multiple colors.

To produce colored metals, two types of femtosecond laser processing techniques were performed. The first technique involved tailoring laser-induced surface random structures, while the second technique produced femtosecond laser-induced periodic surface structures (FLIPSS). The colored metals produced by the first technique exhibit the same apparent color at various viewing angles, while the colored metals produced by the second technique exhibit different colors at different viewing angles due to a grating effect.

Figure 35C:
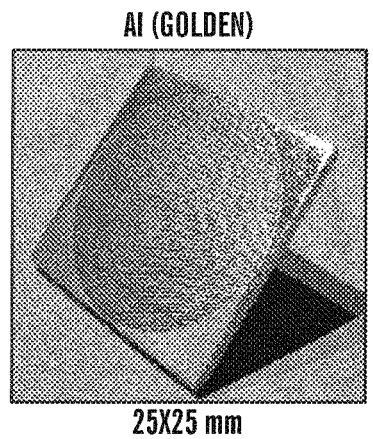

FIG. 35(c) shows a picture of a colored aluminum sample produced by the controlled tailoring of random surface roughness. The aluminum appears golden in color because the tailored surface structures preferentially enhance the absorption at blue and green wavelengths. The spectral reflectance of the golden aluminum is shown in FIG. 34.

Colored metals produced by the second technique, FLIPSS, exhibit different colors at different viewing angles.

Figure 36A:
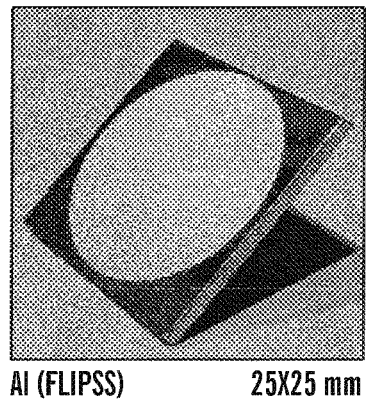
FIGS. 36A, 36B show photographs of Al colored by NC-LIPSS, where the color of the samples depend upon the viewing angle due to a grating effect, according to an illustrative embodiment of the invention.
Figure 36B:
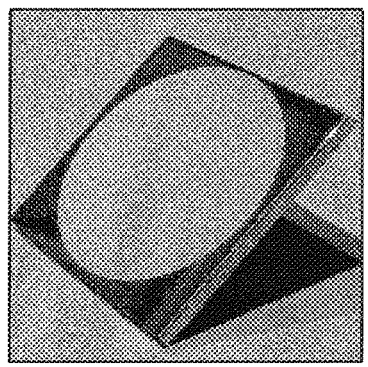

FIG. 36 shows various colors of an aluminum sample structured with FLIPSS under experimental conditions of F=0.05 J/cm², f=83 Hz, v=1 mm/s, and S=100 µm. The spectral reflectance of the color aluminum structured with FLIPSS is shown in FIG. 34. Structuring with FLIPSS can cause a polarization effect on the absorption of light that provides an additional way for controlling the optical properties. The size of the optically modified metal surface area can be as small as a tightly focused laser spot; i.e. down to about 10 µm, or as large as desired by using a scanning laser beam (for example, FIGS. 35 and 36 show samples with structurally modified area of about 24 mm in diameter).

Given the additional advantages of laser processing such as low contamination and capability to process complicated shapes, the black, grayed, and colored metals created by femtosecond laser surface structuring have numerous potential applications in such areas including, but not limited to, photonics, plasmonics, optoelectronics, stealth technology, thermal radiation sources, solar cell absorbers, radiative heat transfer devices, infrared sensing, biooptical devices, thermophotovoltaics, and airborne/space borne devices.

While specific embodiments of the present invention have been described herein, it will be appreciated by those skilled in the art that many equivalents, modifications, substitutions, and variations may be made thereto without departing from the spirit and scope of the invention as defined in the appended claims.

What is claimed is:

1. An object comprising:
   a metal or metal alloy having a surface with a femtosecond laser treated region;
   the surface having a pre-laser treatment profile;
   the metal or metal alloy having a first light absorption when profiled per the pre-laser treatment profile;
   the femtosecond laser treated region of the surface comprising laser-induced periodic surface structures comprising:
   periodic microscale structure shapes formed on the metal or metal alloy; and
   a plurality of nanoscale structure shapes formed by the metal or metal alloy covering the periodic microscale structure shapes, the nanoscale structure shapes including a plurality of nanoscale protrusions extending outwardly away from the microscale structure shapes;
   the laser-induced periodic surface structures increasing absorption of at least some light wavelengths of the metal or metal alloy within the femtosecond laser treated region so that the metal or metal alloy within the femtosecond laser treated region has a second light absorption greater than the first light absorption.

2. The object of claim 1, wherein the microscale structure shapes comprise a plurality of at least one of micropores, microgrooves, and microchannels.

3. The object of claim 1, wherein the laser-induced periodic surface structures have a period that is less than a wavelength of the femtosecond laser.

4. The object of claim 1, wherein the laser-induced periodic surface structures form a grating.

5. The object of claim 1, wherein the laser-induced periodic surface structures have a period on a sub-micron level.

6. The object of claim 1, wherein the laser-induced periodic surface structures have a microroughness in a range of 1-15 micrometers.

7. The object of claim 1, wherein the laser-induced periodic surface structures reflect less than 10% of light having a wavelength between 250-2500 nm.

8. The object of claim 1, wherein the laser-induced periodic surface structures exhibit different colors depending on viewing angle due to a grating effect.

* * * * *